United States Patent
Charlson

[19]

[11] Patent Number: 6,125,608

[45] Date of Patent: Oct. 3, 2000

[54] COMPOSITE INSULATED FRAMING MEMBERS AND ENVELOPE EXTENSION SYSTEM FOR BUILDINGS

[75] Inventor: Joseph A. Charlson, Natick, Mass.

[73] Assignee: United States Building Technology, Inc., Allston, Mass.

[21] Appl. No.: 09/056,449

[22] Filed: Apr. 7, 1998

Related U.S. Application Data

[60] Provisional application No. 60/042,782, Apr. 7, 1997, and provisional application No. 60/063,102, Oct. 24, 1997.

[51] Int. Cl.[7] ....................................... E04B 1/74
[52] U.S. Cl. ....................... 52/733.2; 52/404.1; 52/404.2; 52/406.2; 52/98
[58] Field of Search ............................... 52/733.2, 781.3, 52/404.2, 404.1, DIG. 4, 98, 100, 406.1, 406.2

[56] References Cited

U.S. PATENT DOCUMENTS

| | | |
|---|---|---|
| 552,939 | 1/1896 | Wahl et al. . |
| 2,076,404 | 4/1937 | Herrington .............................. 52/404.1 |
| 3,003,902 | 10/1961 | McDuff ................................ 52/406.2 X |
| 3,111,787 | 11/1963 | Chamberlain . |
| 3,332,170 | 7/1967 | Bangs .................................. 52/733.2 X |
| 3,662,509 | 5/1972 | Studzinski ............................. 52/404.1 |
| 3,713,925 | 1/1973 | Hartzell et al. . |
| 3,852,935 | 12/1974 | Jones ..................................... 52/DIG. 4 |
| 3,927,504 | 12/1975 | Forrister . |
| 3,940,526 | 2/1976 | Fathi .................................. 52/404.1 X |
| 3,949,529 | 4/1976 | Porter ................................. 52/733.2 X |
| 3,958,385 | 5/1976 | Bondra, Jr. et al. ................... 52/631 X |
| 4,224,774 | 9/1980 | Peterson ................................ 52/404.1 |
| 4,257,204 | 3/1981 | Rieger ................................ 52/404.2 X |
| 4,298,647 | 11/1981 | Cancio et al. . |
| 4,346,543 | 8/1982 | Wilson et al. .......................... 52/404.2 |
| 4,384,437 | 5/1983 | Coles .................................... 52/404.3 |
| 4,486,995 | 12/1984 | Allen et al. .......................... 52/DIG. 4 |
| 4,586,308 | 5/1986 | Jennings . |
| 4,646,499 | 3/1987 | Wilson ............................... 52/406.1 X |
| 4,709,523 | 12/1987 | Broderick et al. . |
| 4,747,246 | 5/1988 | Sanborn ............................... 52/DIG. 4 |
| 4,835,026 | 5/1989 | Horiki et al. . |
| 4,866,905 | 9/1989 | Bihy et al. ............................. 52/105 X |
| 5,003,742 | 4/1991 | Dettbarn ............................. 52/733.2 X |
| 5,024,033 | 6/1991 | Anderson .............................. 52/404.2 |
| 5,099,629 | 3/1992 | Gay ..................................... 52/406.2 |
| 5,209,036 | 5/1993 | Cancilliari . |
| 5,329,738 | 7/1994 | Ovaert et al. ..................... 52/506.05 X |

(List continued on next page.)

FOREIGN PATENT DOCUMENTS

| | | | |
|---|---|---|---|
| 2041990 | 3/1972 | Germany ............................. 52/406.2 |
| 3113312 | 10/1982 | Germany ............................. 52/404.1 |
| 3327-142 | 1/1985 | Germany ............................. 52/406.1 |
| 3937-353 | 5/1991 | Germany ............................. 52/406.1 |
| 8101193 | 3/1981 | Netherlands ......................... 52/404.1 |
| 2278373 | 11/1994 | United Kingdom .................. 52/404.1 |

OTHER PUBLICATIONS

*Thermal Design Guide for Exterior Walls*, American Iron and Steel Institute, Jan. 1995.
*Understanding Insulation for Metal Buildings*, North American Insulation Manufacturer's Association, Apr. 1997.
*Extruded Polystyrene Insulation and Housewrap*, Tenneco Building Products Catalog (Cover Sheet, pp. 4–5).

*Primary Examiner*—Carl D. Friedman
*Assistant Examiner*—Brian E. Glessner
*Attorney, Agent, or Firm*—Testa, Hurwitz & Thibeault, LLP

[57] ABSTRACT

An insulated framing system for providing improved thermal insulation in a building such as a home includes structural supports such as dimensional lumber studs or metal studs having a rigid insulator attached along at least one edge thereof. The resulting composite member provides a thermal break between the structural support and the sheathing, wallboard, or other structure supported thereby. Further, the addition of the insulator deepens wall cavities, permitting installation of more insulation material. One or more wings extending from the insulator into the cavities facilitates installation and retention of insulation material in the cavities prior to installation of sheet good finish materials such as gypsum wallboard.

21 Claims, 26 Drawing Sheets

U.S. PATENT DOCUMENTS

| | | | |
|---|---|---|---|
| 5,356,446 | 10/1994 | Smetana et al. | 52/404.1 X |
| 5,414,969 | 5/1995 | Krejci et al. | 52/DIG. 4 |
| 5,425,908 | 6/1995 | Merser . | |
| 5,465,542 | 11/1995 | Terry . | |
| 5,476,559 | 12/1995 | Chiro | 52/DIG. 4 |
| 5,545,453 | 8/1996 | Grant | 52/406.2 X |
| 5,701,711 | 12/1997 | Bases et al. | 52/404.1 X |
| 5,765,318 | 6/1998 | Michelsen | 52/99 X |

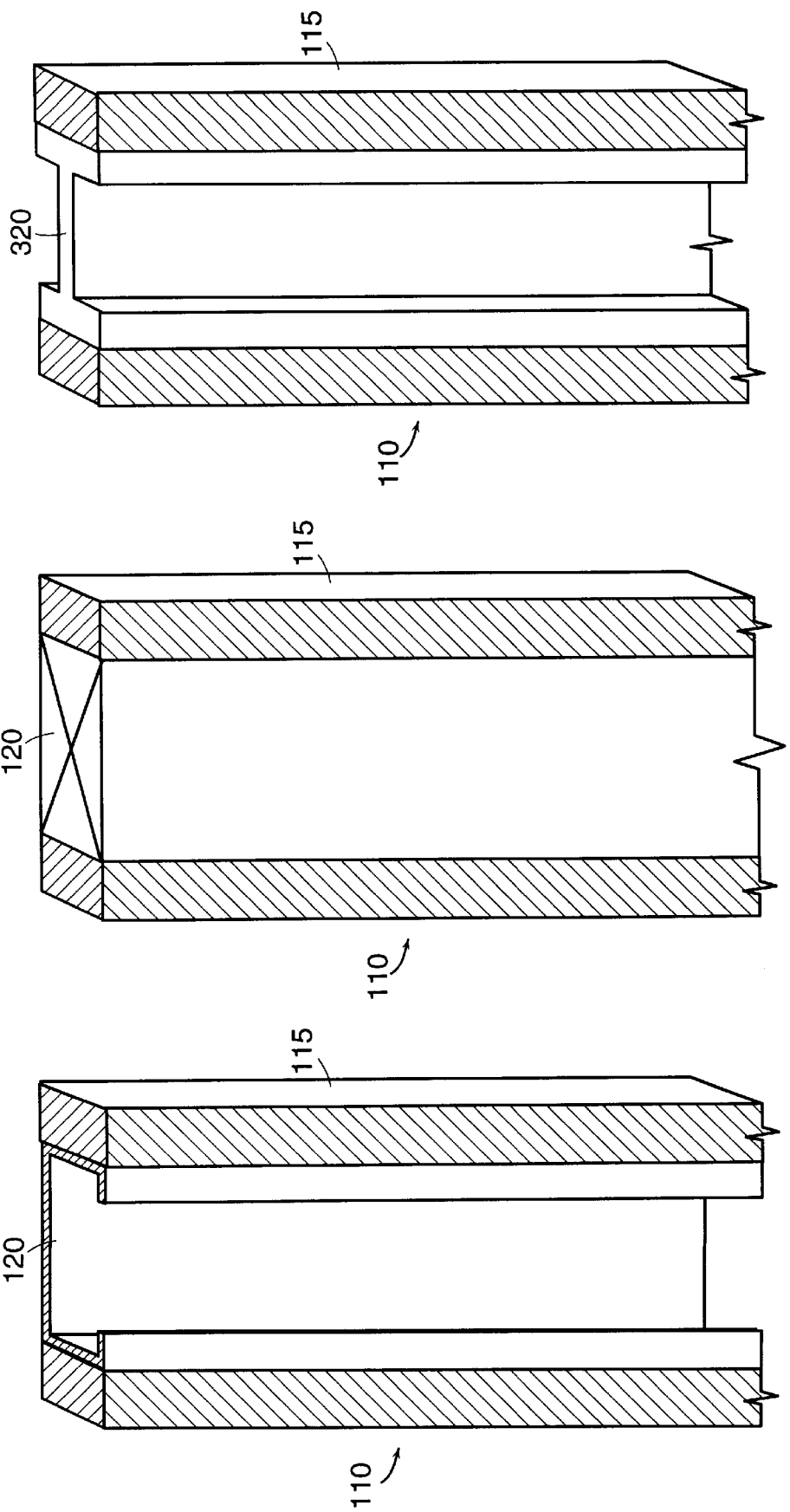

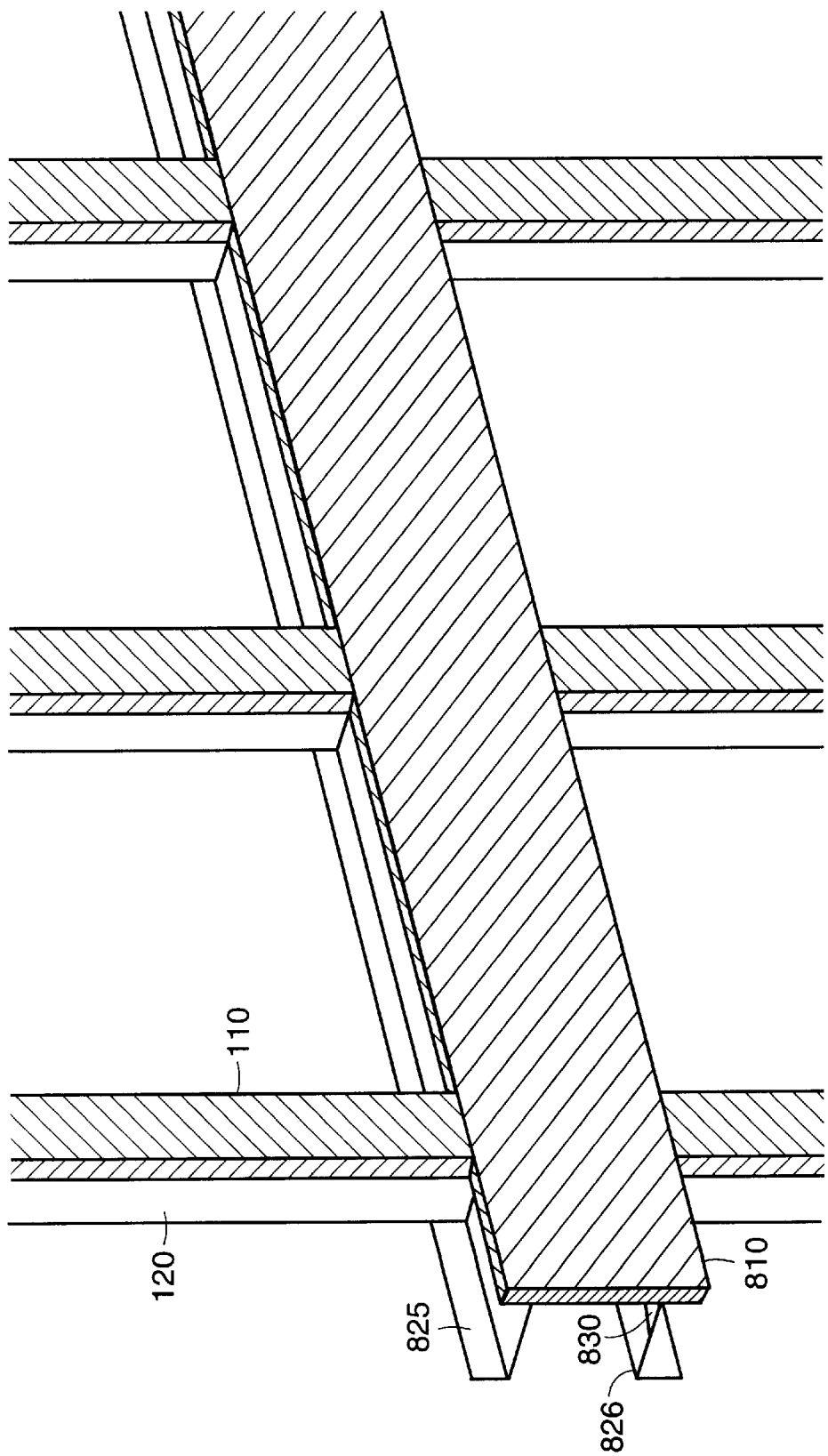

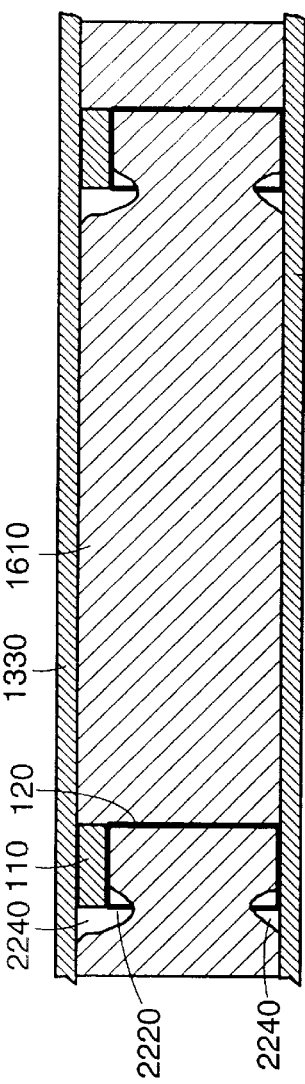
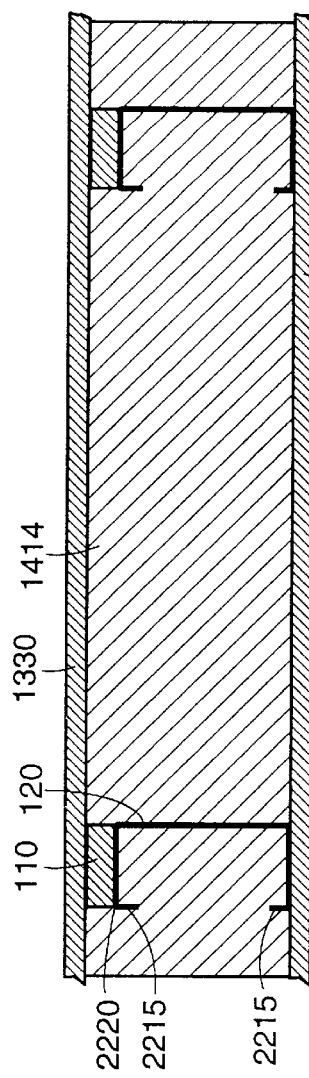
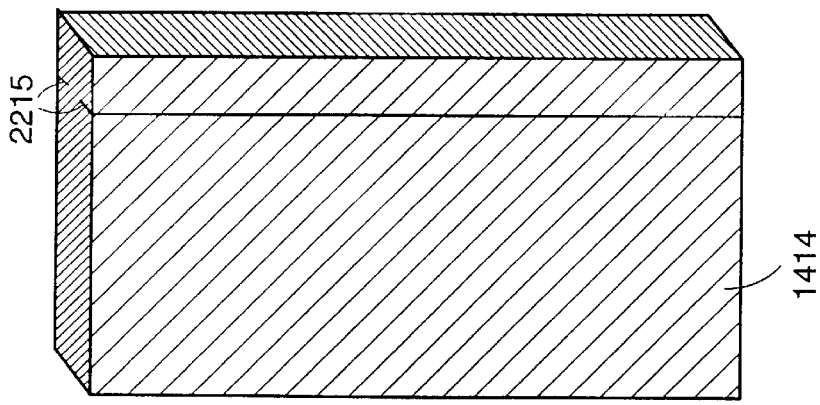

COMPOSITE INSULATED FRAMING MEMBERS AND ENVELOPE EXTENSION SYSTEM FOR BUILDINGS

This application claims priority to U.S. Provisional patent application Ser. No. 60/042,782 filed Apr. 7, 1997, and U.S. Provisional patent application Ser. No. 60/063,102 filed Oct. 24, 1997.

TECHNICAL FIELD

The invention relates generally to building systems and more specifically to the combination of insulators with structural supports to provide improved thermal insulation and/or acoustic damping within the building.

BACKGROUND

Thermal bridging through structural framing members can be a major source of conductive heat losses through a building envelope. The need for improved thermal performance in buildings has led to the increase in popularity of two techniques for enhancing building thermal insulation. According to a first method, a wall conventionally framed with 2×4 studs or other dimensional lumber is covered, either on the inside or outside surfaces with continuous rigid insulation board sheathing. A major limitation of this technique is the relatively high economic and environmental cost of the rigid insulation boards. Perhaps more significantly, certain problems exist with the structural properties of this type of construction assembly. For example, using a continuous layer of foam sheathing on exterior portions of the framing generally requires the use of cross-bracing to impart resistance to wall racking and wind loading. Alternatively, using rigid insulation sheathing on interior wall surfaces typically results in reduced areas of structural surfaces for attaching interior wall coverings such as wallboard in corners. Increased length mechanical fasteners such as screws or nails are also required for hanging wallboard or mounting pictures, shelving, etc. Such walls may also exhibit poor resistance to compressive loading that can be manifest in wavy, non-true walls with screw or nail heads popping out of the wallboard.

According to the other method for enhancing building thermal insulation, dimensional lumber which is deeper than necessary to support anticipated structural loads may be used to conventionally frame the walls, such as 2×6 studs instead of 2×4 studs. Use of deeper studs results in thicker walls with deeper cavities which can accommodate more cavity insulation.

SUMMARY OF THE INVENTION

According to the invention, a composite member for use in construction of a structural element of a building includes an elongate structural support such as a wooden wall stud, ceiling or floor joist, or C-shaped metal stud and an insulator. The structural support has an external surface and a cross-sectional perimeter. The support and insulator are combined such that the insulator is in contact with solely a portion of the external surface of the support, generally along no greater than about one half of the support perimeter. The insulator provides a thermal break between the structural support and structure supported thereby, such as plywood sheathing or interior wallboard. In a typical embodiment, the insulator has a lower thermal conductivity, k, than the support. Further, the insulator forms part of the structure of the building, the load path induced by the supported structure passing through the insulator into the structural support.

According to another embodiment of the invention, the composite member may include a second insulator in contact with solely a second portion of the external surface of the support generally along no greater than about one half of the support perimeter. The second insulator provides a thermal break between the structural support and additional structure supported thereby along another load path passing through the second insulator. The second insulator may be made of the same or different material as the first insulator and may exhibit a similar or different thermal conductivity.

In order to maintain contact between the support and the insulator(s) during construction or installation, a variety of techniques may be employed, alone or in combination. In one embodiment, the insulator is adhered to the external surface of the support using an adhesive bonding agent. The adhesive force therebetween may range from being merely sufficient to maintain the structural integrity of the composite member during manufacture, storage, and shipping, to exhibiting tensile and/or shear strength characteristics exceeding similar properties of the insulator material. A second adhesive layer, with or without a release paper layer, may be provided on an exposed surface of the insulator to facilitate installation of a vapor barrier sheet or a structural sheet good such as plywood or wallboard during building construction.

In another embodiment, the insulator forms an inwardly disposed channel or similar structural feature in which a portion of the external surface of the support is disposed and maintained by friction forces. In still other embodiments, mechanical fasteners such as nails or staples may be employed. Magnetism may be employed with ferrous studs and supports, the insulator having a magnetic tape adhered thereto or being coated with a magnetic paint.

The composite member may be manufactured on a continuous process line with an insulative material being dispensed directly on the support surface and permitted to cure. The insulative material may be shaped during curing and/or trimmed thereafter to form an integral insulator of the desired cross-section and contour.

The composite members may be used instead of conventional dimensional lumber, manufactured wood beam products, and fabricated metals, as structural members and framing members in constructing building structural elements such as walls, floors, ceilings, and roofs.

According to another embodiment of the present invention, the composite member may include a generally planar structural support, for example a sheet good such as plywood sheathing or wallboard, in combination with a plurality of generally elongate insulators disposed in contact with solely respective portions of an external surface of the support. The insulators may be arranged in a generally parallel pattern, one to another, to provide thermal breaks between the structural support and structure supported thereby, for example wall studs or floor joists. In a typical embodiment, the insulators have lower thermal conductivity than the support. Further, the insulators form part of the structure of the building, the load path induced by the supported structure passing through the insulator into the structural support. Any of the techniques discussed hereinabove may be employed to maintain contact between the insulators and the structural support. Alternatively, the sheet good may abut a structural element such as a masonry wall with the insulators disposed on an exterior side thereof The insulators may then be covered with an external finish material such as stucco.

According to the invention, the insulator may be manufactured from a generally rigid self-supporting insulating material in any of a variety of configurations to suit different construction details. In general, the insulator has a cross-sectional perimeter, a portion of which is adapted to contact solely a portion of an external surface of a structural support generally along no greater than about one half of the perimeter thereof. The insulator provides a thermal break between the structural support and structure supported thereby along a load path which passes through the insulator. Accordingly, the insulator is manufactured of a material, density, and configuration to withstand anticipated compressive loading, with margin, so as to function properly as a structural feature of the building, as well as a thermal insulator. Further, the insulators may include one or more axially extending wings which partially bridge wall stud cavities, floor joist cavities, cathedral ceiling rafter cavities, or ceiling joist cavities to facilitate installation and retention of non-rigid insulation such as fibrous glass batts. When C-shaped metal studs are used, a flexible or semi-flexible batt forming a perforation along at least one edge thereof may be employed, the batt being sized to substantially fill each stud cavity and channel formed in the metal stud.

To facilitate manufacture, storage, and transport, a plurality of insulators may be formed integrally in a sheet and partially subdivided with frangible connections disposed therebetween. In the field at a construction site, a laborer may break off insulators as needed, mate the insulators with structural supports to form composite members and use the members to construct the building. In an alternative method, the building may be partially framed and the insulators applied thereafter as necessary prior to sheathing. As with conventional construction techniques, a structural element such as a wall of a building may be assembled with composite members such that the insulators lie generally within a plane which is then sheathed and raised. Sheathing may be attached by a variety of methods, including the use of structural adhesives to bond the sheathing to the insulators and/or mechanical fasteners which penetrate the insulators and the structural supports. In one embodiment, pointed, modified buttress thread screws having enlarged diameter heads may be used.

According to an alternative embodiment of the present invention, a building element such as a wall may be conventionally framed, and insulation applied to the structural supports in situ, simultaneously covering exposed flanges of the supports and filling the cavity to a desired thickness. Sheathing or wallboard may then be applied.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIGS. 4A–4C are schematic perspective views of C-section, solid, and I-section framing members combined with insulators on both flange surfaces;

FIGS. 8A and 8B are schematic perspective and end sectional views of a portion of wall framing including several insulated wall studs connecting with an insulated joist track;

FIG. 22 is a schematic view of semi-flexible or flexible cavity insulation material perforated to accommodate composite C-section framing members or other framing cross-sections which include inwardly projecting lips;

FIG. 23 is a schematic cross-sectional view of an insulated wall cavity in which non-perforated insulation material is disposed, resulting in performance reducing air gaps;

FIG. 24 is a schematic cross-sectional view of an insulated wall cavity in which perforated insulation material is disposed, resulting in substantially complete filling of the cavity, without performance reducing air gaps;

DETAILED DESCRIPTION

The terms framing insulation or insulated framing as used herein generally describe a technology and a building construction system where relatively costly rigid insulation material is optimally placed along a frame of a building to provide thermal and/or acoustic insulation, for example by deepening envelope cavities, minimizing air seepage, and increasing structural integrity without the expense of continuous rigid insulation board sheathing. The system can be used to achieve levels of shear wall performance comparable to base case code adopted and industry standard values for building structural elements. The system can also be used advantageously to resist hurricane forces, wind uplift forces, lateral shear forces, as well as other dynamic and static compressive loads in structural roofing applications.

Figure 1A:
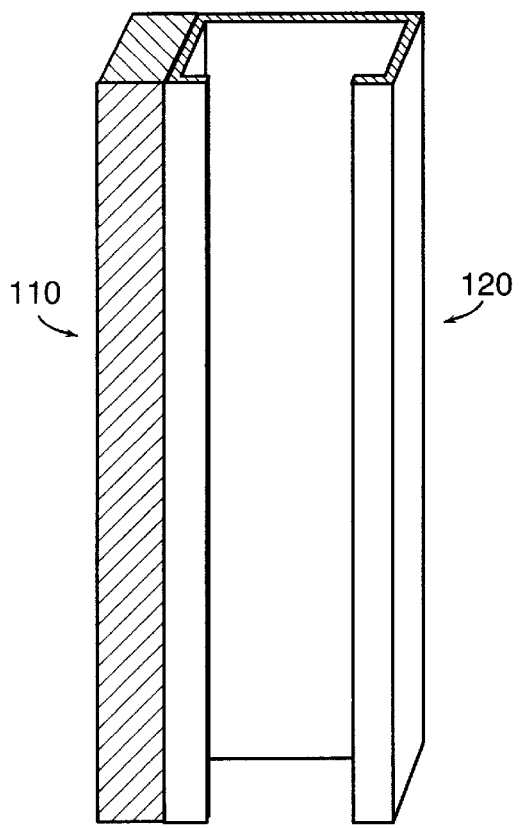
FIGS. 1A and 1B are schematic perspective views of composite insulated C-section framing members made of steel, other metal, fiberglass, etc. illustrating two and three material composite members.
Figure 1B:
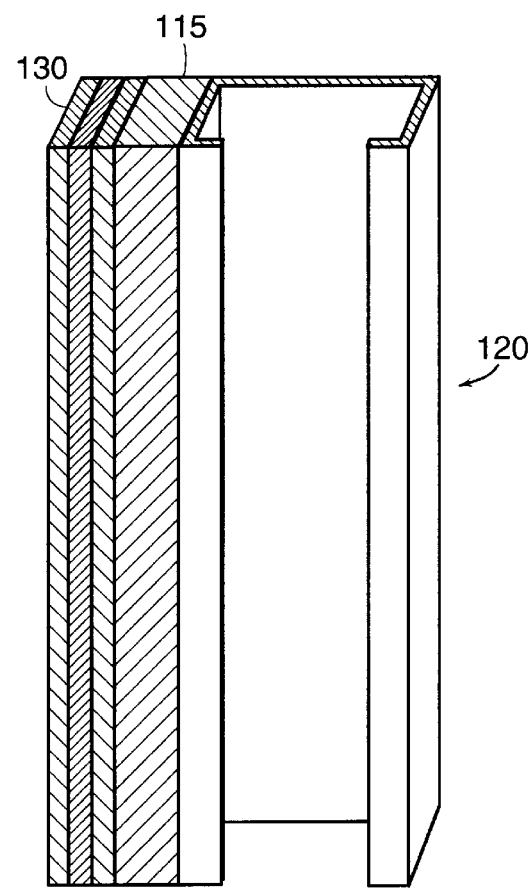

Referring to FIGS. 1A and 1B, composite insulated framing members are illustrated each having a C-section standard framing member 120 or structural support and one or more elongate layers of rigid thermal insulation 110, 115, and 130. The major axial and flexural resistances are provided by the C-section framing member 120. This C-section member may be steel, other metals, fiberglass resin, or other structural materials and compositions. The thermal insulators 110, 115, and 130 provide compressive resistances, either alone or in combination, to both maintain a nominal thickness necessary to provide a sufficient break in the rate of conductive heat transfer through the composite member and to allow for load transfer between major structural elements in the building such as structural sheathing and the C-section framing component. The thickness of the composite member can be tailored to be compatible with standard framing member sizes. For example, if the C-section framing member 120 is a standard 2×4 nominal framing member, actual dimensions are about 1.5 inches by about 3.5 inches. Adding a two inch thick insulator 110 will yield a composite member having a depth of about 5.5 inches, making it compatible with standard window and doorjamb extensions kits used in conventional 2×6 framing. The insulators 110, 115 have thermal conductivities sufficiently lower than the C-section element 120 to provide a substantial change in the rate of heat transfer through the composite member. Materials chosen for these elements may range from highly insulative plastic foams such as extruded polystyrene and polyurethane to medium grade thermal insulators such as cellulose composites and wood. The actual material selected will depend on the structural loads, the thickness required, and the composition of the structural support framing member 120.

Further, the insulator may have a uniform density, multiple densities, or a density which varies as a function of depth. The multiple densities may be stepped in discrete layers or can occur in smooth gradients throughout the insulator. The densities may also be varied in non-linear fashion to provide, for example, two exposed faces of higher density and strength than a lower density third exposed face. The density of the insulator may be varied to provide one or more surfaces capable of receiving and holding mechanical fasteners such as nails, screws, and pins.

One reason for using two distinct insulators 115, 130 is economics. If the outermost facing insulator 130 is a high strength material such as a metal or wood, innermost insulator 115 can be manufactured from a lower density, less costly insulator material. The compressive strength of the outermost insulator 130 can be used to compensate for the lower density of the innermost insulator 115 such that the composite member is sufficiently strong to resist normal building loads. The insulators 100, 115 may be either bonded to the standard framing member 120 with a structural adhesive or formed directly on the framing member 120 if the insulator 110, 115 has sufficient bond strength with the material from which the framing member 120 is manufactured. An example of the former is expanded polystyrene and of the latter is polyurethane.

Figure 2A:
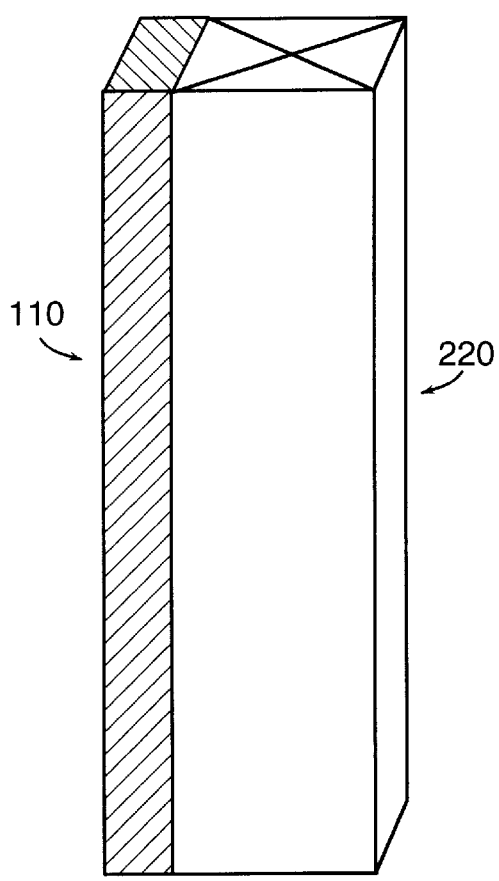
FIGS. 2A and 2B are schematic perspective views of composite insulated solid framing members made of wood, laminated fibers, plastic lumber, etc. illustrating two and three material composite members.
Figure 2B:
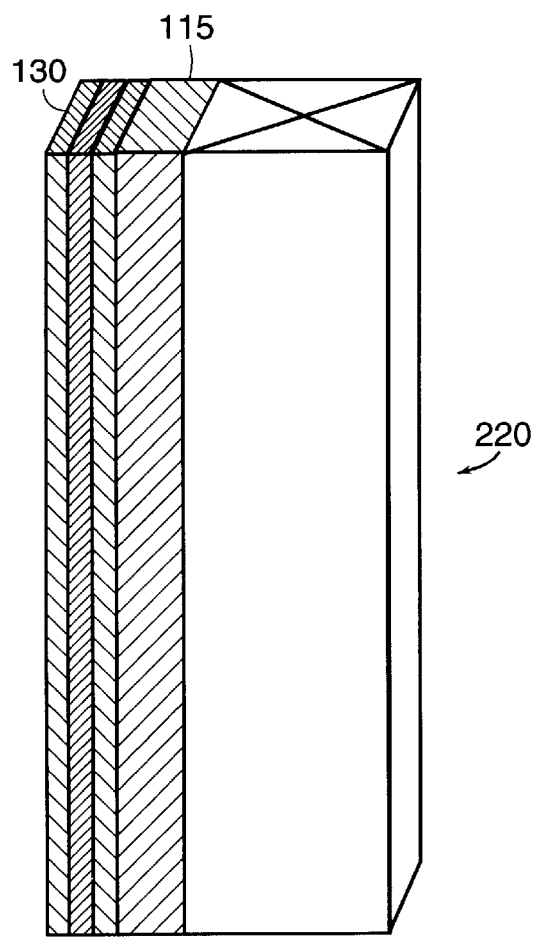
Figure 3A:
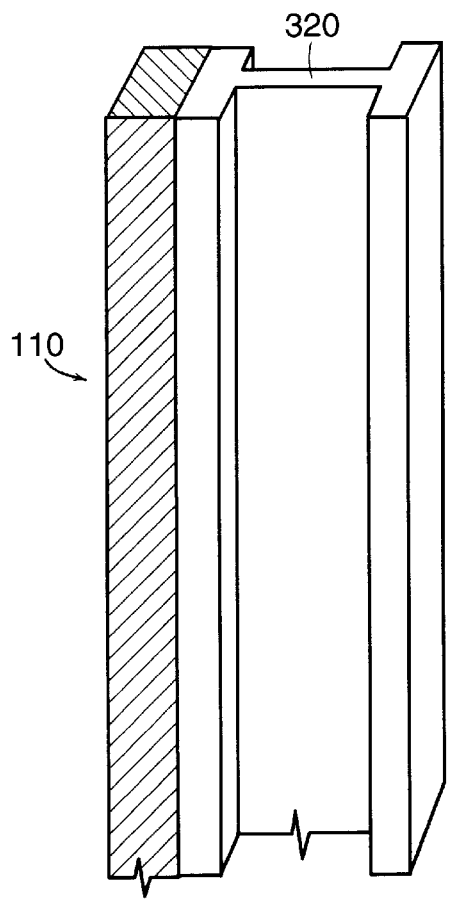
FIGS. 3A and 3B are schematic perspective views of composite insulated I-section solid framing members made of metal, wood, laminated fibers, plastic lumber, etc. illustrating two and three material composite members.
Figure 3B:
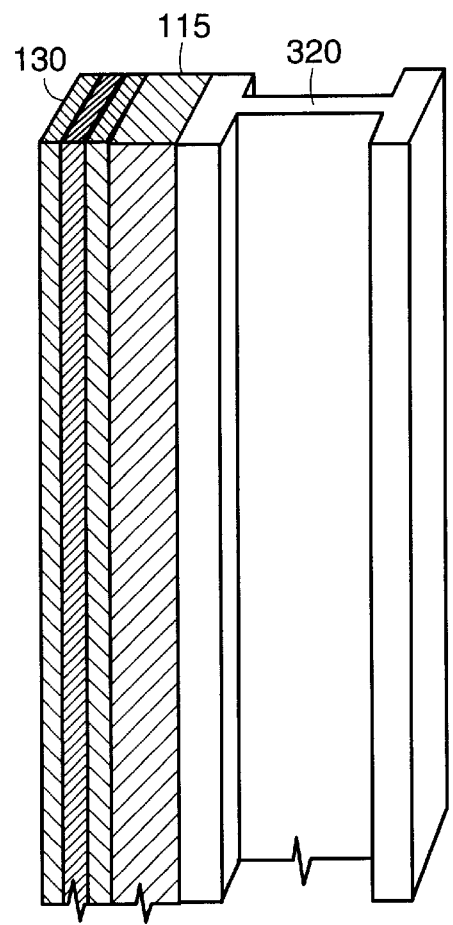

These insulated framing composite members may be used in any application where conventional framing members can be used, such as wall studs, floor joists, ceiling joists, roof truss chords, headers, tracks, plates, cripples, multiple members at jambs, band joists, joist tracks, etc. FIGS. 2A–2B and FIGS. 3A–3B are substantially similar to FIGS. 1A–1B, except for the cross-section of the structural support framing member. FIGS. 2A–2B illustrate two and three material composite members with a solid cross-sectional standard framing member 220 such as dimensional lumber. FIGS. 3A–3B illustrate insulated composite members with an I-beam cross-sectional framing member 320. The I-beams may be made from any standard or newly developed material that provides sufficient axial and flexural resistances to resist anticipated loads on the composite member.

Referring now to FIGS. 4A–4C, the insulators 110, 115 in these multi-member composites are located on both opposed flange surfaces of the structural supports, whether C-section 120, solid 220, I-beam 320, or other cross-sectional framing member. The insulator density and material may be varied to accommodate anticipated loads and facilitate member installation for the specific application. From a thermal resistance standpoint, the benefit of the thermal break elements is directly proportional to the overall thermal resistance of the insulator, which is a function of the total thickness of the insulators applied and the series thermal resistivity of those materials employed.

Figure 5A:
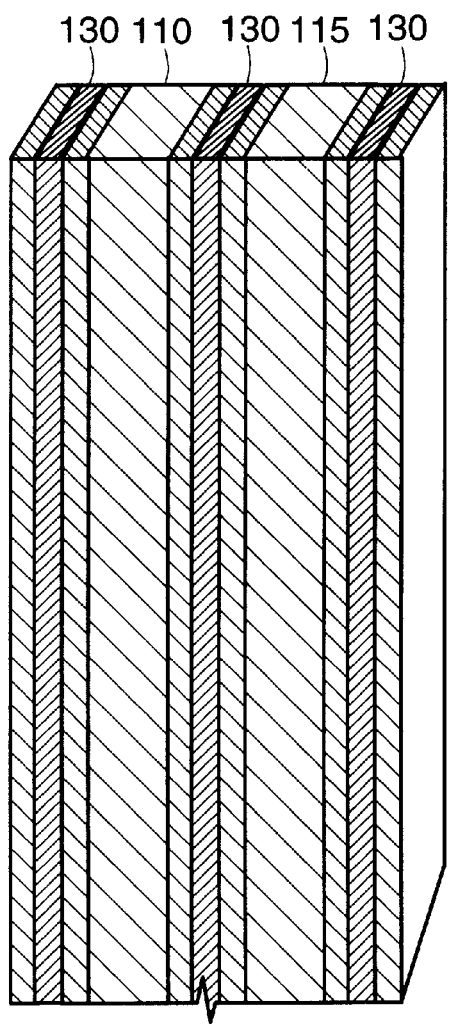
FIGS. 5A and 5B are schematic perspective views of two and three member composite framing members having an insulator sandwiched between two or more higher density rigid nail base surfaces typically used for non-axial load bearing assemblies for supporting loads generally perpendicular to the finished surfaces.
Figure 5B:
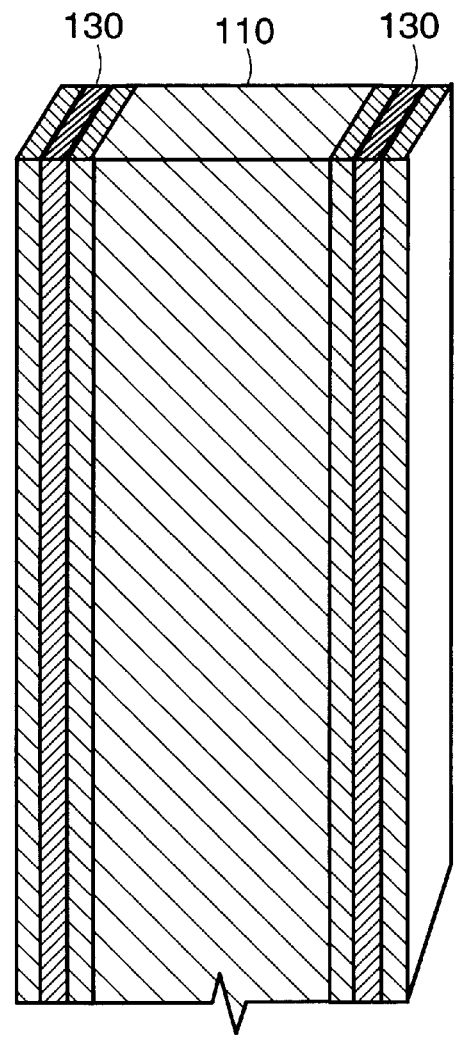

In FIGS. 5A–5B, the thermal insulators 110, 115, and 130 are combined to create laminated structural insulated framing members. In these members, one or more of the insulators also functions as the structural support. For example, insulator 130 may be manufactured from plywood or oriented strand board. These composite members are sized, however, as framing members, not large sheet good panels. These composite members are particularly useful for insulating structural elements of a building that already provide sufficient resistance to axial, lateral, and flexural building loads. An example is insulating load-bearing masonry walls. These composite members may be affixed to the masonry wall with structural adhesive or mechanical fasteners to form insulation cavities therebetween. The cavities may be filled with a non-rigid insulating material such as flexible batts, blankets, or blown-in cavity insulation materials. Sheathing or wallboard may be applied to finish the wall.

Figure 6:
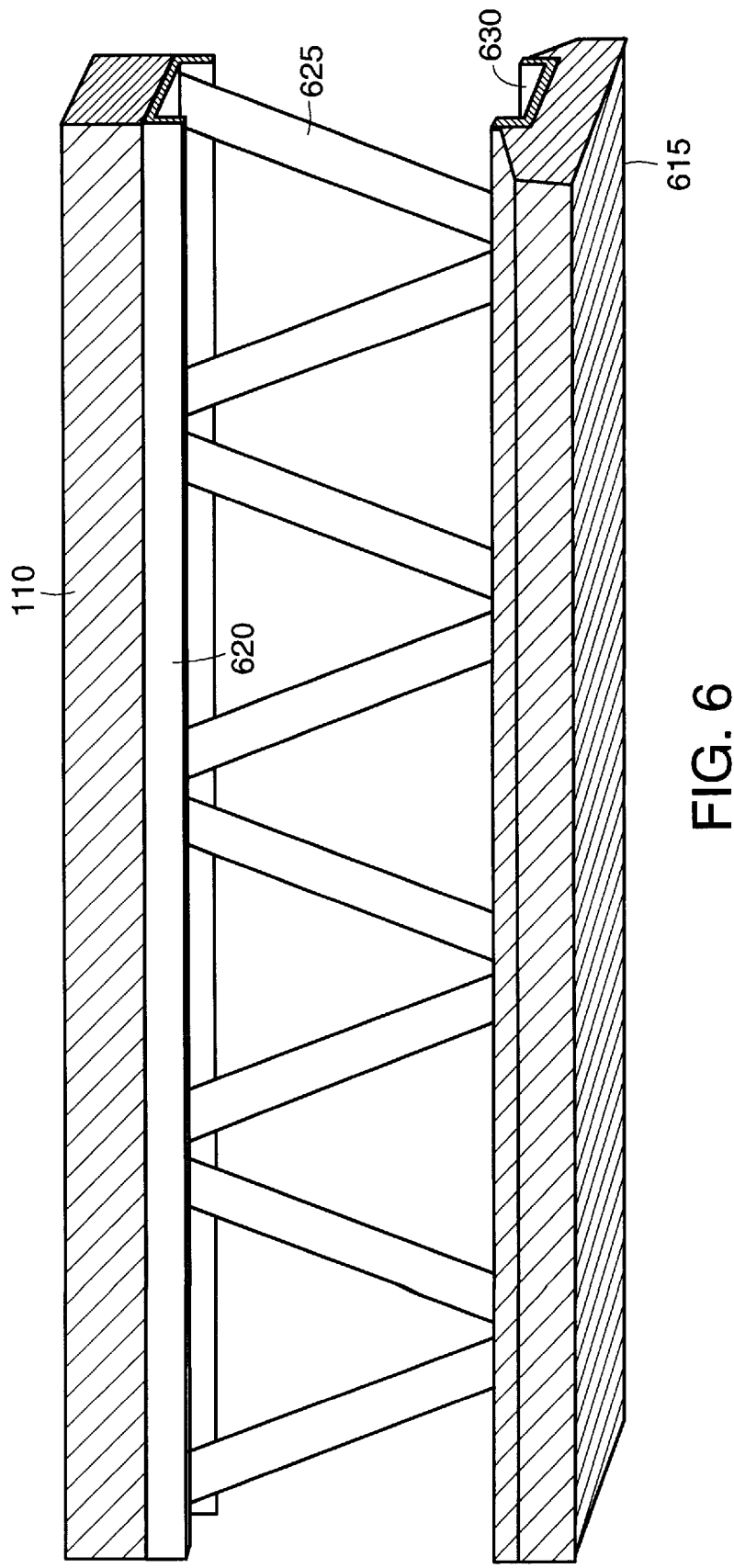
FIG. 6 is a schematic perspective view of a double insulated composite truss member having a first insulator matching a width of a first truss chord flange and a second insulator having wings extending wider than a width of a second truss chord flange.

FIG. 6 depicts a composite truss framing member. Both a top chord 620 of the truss and a bottom chord 630 of the truss are insulated. The top and bottom chords 620, 630 are connected by a plurality of web elements 625. The structural material of the truss may be metal, cellulose fiber composite, wood, or other suitable compositions known in the art. An insulator 110 disposed along the top chord 620 has a width which substantially matches that of the top chord 620 to allow greater quantities of non-rigid insulation to be placed in an attic or ceiling space framed with the truss. An insulator 615 disposed along the bottom chord 630, however, has a width that is greater than that of the bottom truss chord 630. These side wings provide a retention lip which facilitates the overhead application of non-rigid insulation material such as batts without the need for use of insulation wires, furring strips, etc.

Figure 7:
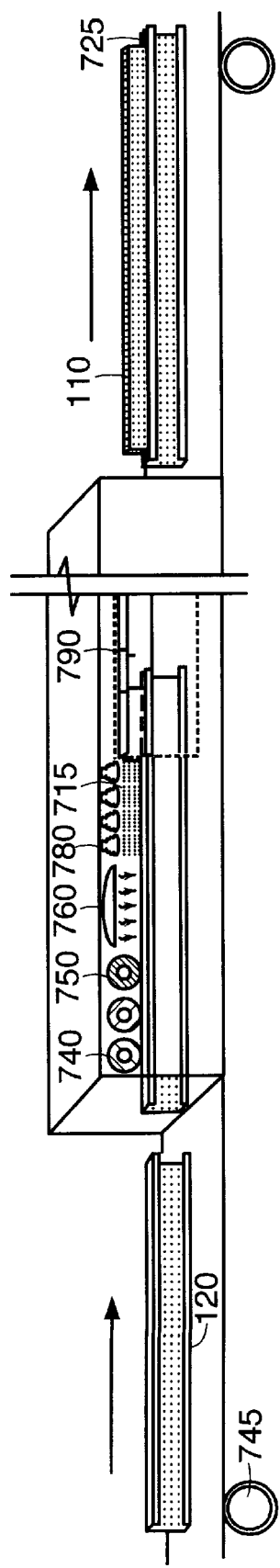
FIG. 7 is a schematic view of a manufacturing process line for forming an insulator directly on a surface of a framing member.

In FIG. 7, a manufacturing process line is depicted for forming insulators directly on a structural support. A C-section framing member structural support 120 travels along a powered conveyor having one or more conveyor drive rollers 745. The C-section 120 passes through a cleaning station 740 which removes any oil, grease, and other contaminants from the flange of framing member 120 to be coated. Next, a drying roller 750, infrared heating lamp 760, and/or other dryer is used to dry the flange surface. A series of spray heads 780 applies an uncured insulator composition 715 to the flange, which then travels through a curing/reaction chamber 790 that shapes and cures the insulator 110. Residual heat in the flange from the dryer may be used advantageously to facilitate curing of the insulator material. The area on which the insulator 110 is applied can be controlled so that one or both end portions 725 of the flange are not covered. This is particularly useful for C-section structural supports 120, since the end portions 725 nest within upper and lower track members.

FIG. 8A depicts a between floor detail of a portion of an insulated framing wall section using composite framing members made of C-section supports 120 with insulators 110. A top track 826, bottom track 825, and joist track 830 are also covered by a rigid insulator 810 so that the entire structural frame is uniformly insulated. Further, the insulators 110, 810 are coplanar, such that cavity depth is also uniform. By insulating the tracks, as well as the wall studs, the overall structural integrity the wall assembly is maintained, as is the thermal performance of the wall.

Figure 8B:
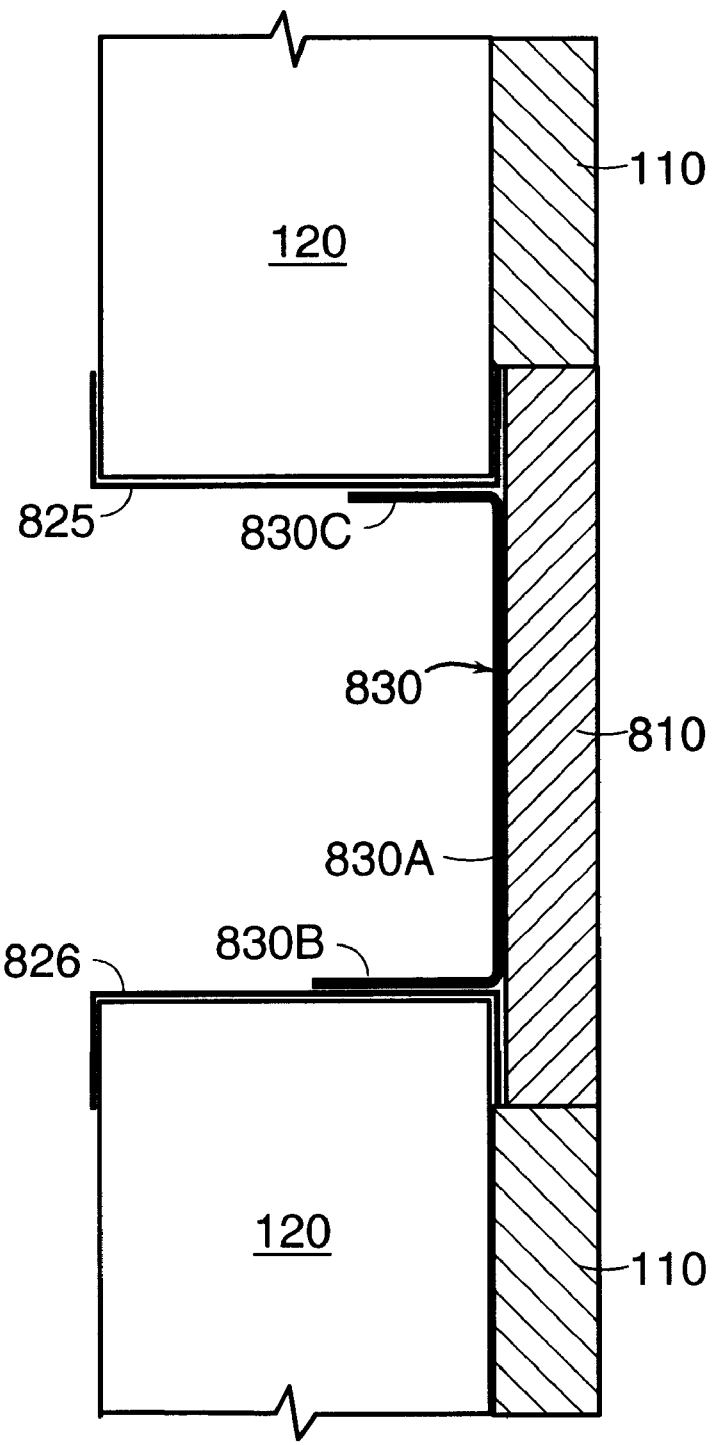

FIG. 8B depicts an end sectional view of the between floor detail depicted in FIG. 8A. The joist track 830 includes an edge 830A disposed generally perpendicular to a predominant direction of unidimensional heat conduction in the wall of the building. First and second flanges 830B, 830C extend from the edge 830A forming a C-shaped channel therebetween for receiving and supporting floor or ceiling joist ends therein.

Figure 9B:
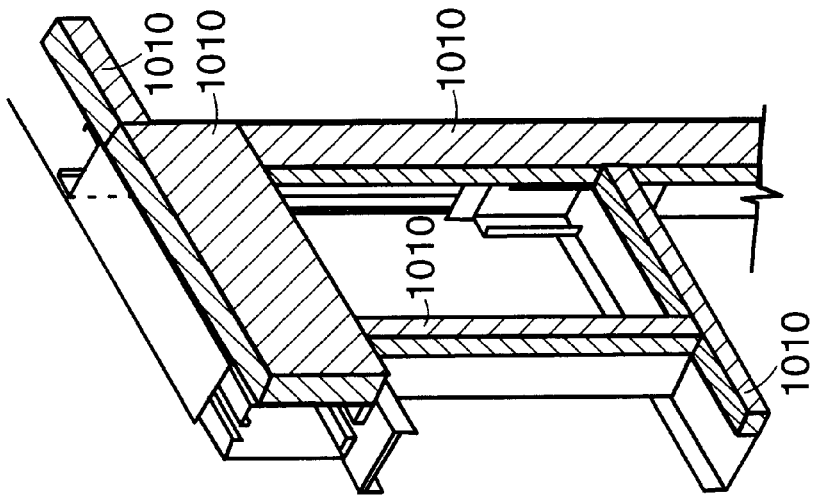
FIGS. 9A and 9B are schematic perspective views of uninsulated and insulated C-section header framing assemblies.
Figure 9A:
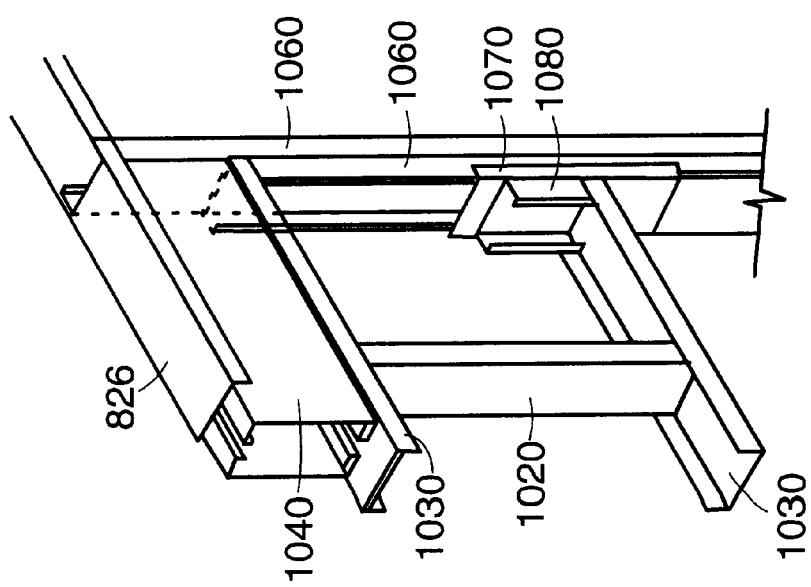

Referring now to FIGS. 9A–9B, a header construction detail is shown before and after application of the insulators 1010. A header beam 1040, head track 1030, top track 826, multiple members required for head and jamb strength 1060, cripple stud 1020, closure track 1070, and stud section connector 1080 are all insulated to a uniform depth. Wall, ceiling, and roof cavities are all subsequently filled with a cavity insulation material and sheathed.

Figure 10:
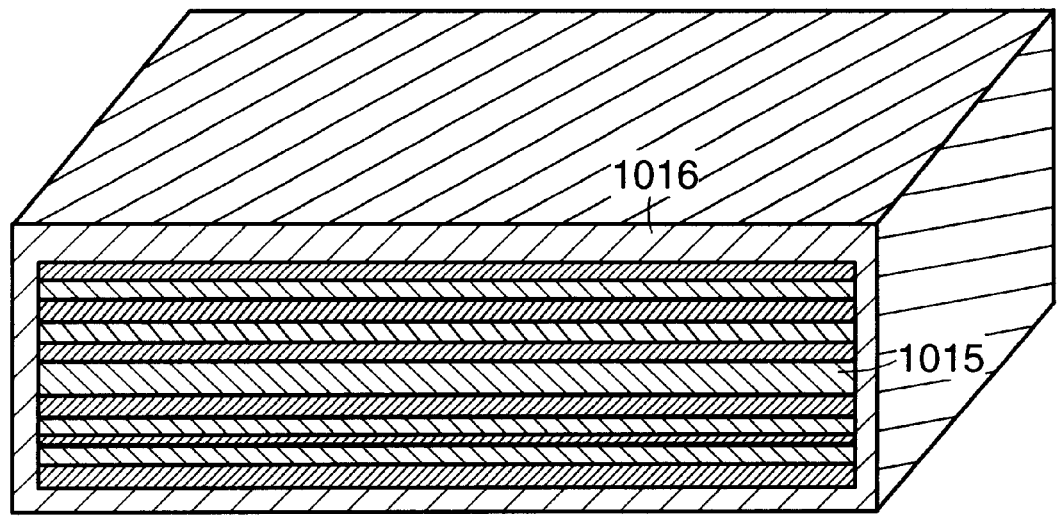
FIG. 10 is a schematic perspective view of a high compressive strength structural insulator for architectural details such as a junction between a top track of a wall and a roof truss, the insulator optionally being wrapped or coated with a thin layer of highly compressible material such as a foam gasket to provide an airtight construction detail and being able to withstand high temperatures to preserve a fire rating of the uninsulated framing assembly.

FIG. 10 depicts a high strength insulator 1015 for high compressive load applications. The insulator 1015 may be manufactured from laminated veneer lumber, dimensional lumber, ceramic alloys, or other materials that exhibit a lower thermal conductivity than the major structural framing members with which it is used, such as steel trusses. The insulator 1015 should have sufficient compressive, temperature, and fire retardant properties. As depicted, the insulator 1015 includes a thin external coating of highly compressible gasket material 1016 around the girth of the insulator 1015. Alternatively, the gasket material 1016 may be applied only along top and bottom surfaces of the insulator 1015 where it contacts abutting structural elements of the building. When the insulator 1015 is installed, the gasket 1016 is compressed, preventing air leakage at construction joints. Further, the gasket 1016 is sufficiently thin and sufficiently compressed at installation that the building structure is not compromised in the event the gasket 1016 melts or burns early in a fire situation. A high shear strength foam adhesive may be selected for this gasket 1016 to impart additional structural strength in applications subject to high levels of wind, hurricane, and seismic activity.

Figure 11:
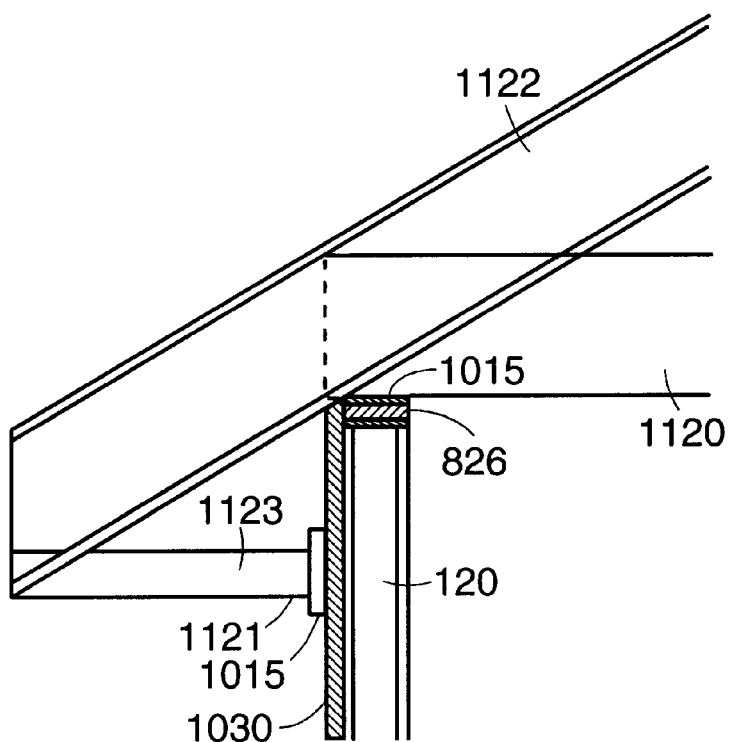
FIG. 11 is a schematic side view of the insulator of FIG. 10 installed at a junction of a top track of a wall and a ceiling joist bottom truss chord and also between soffit framing and exterior sheathing.

Installation applications for the high strength insulator 1015 are depicted in FIG. 11. The junction of a roof truss with a top wall track and the junction of soffit framing with exterior sheathing are two specific locations where the high compressive strength insulator 1015 is beneficial. A bottom chord of the roof truss or ceiling joist 1120 joins a top truss chord or rafter 1122 and connects to a top plate 826 through the high compressive strength insulator 1015. A high compressive resistance is desirable to resist static and dynamic roof loads. In the second application, soffit framing 1123 joins a soffit track 1121 and connects to structural sheathing 1130 through the insulator 1015. In a ventilated attic application, when cold air enters through soffit vents, the insulators 1015 provide thermal breaks between the insulated exterior walls and the unconditioned outside air.

In FIGS. 12A–12I multiple insulator profiles are illustrated, all of which make use of a common friction-fit interim attachment method. Each profile includes a central insulating body or core 1210 and a pair of friction arms 1215 that form a U-shaped channel 1220 to receive a framing member structural support. The channel width, shown as dimension C, should be slightly smaller than a nominal width of the framing member flange so that the insulator is elastically deformed when installed on the support. The friction fit works independent of temperature and weather conditions. In addition to the friction fit, the arms 1215 serve a thermal function, acting to reduce the lateral transmission of heat from the framing member to the cavity. Dimension B is the overall depth of the insulator and dimension D depicts the depth of the friction fit channel. The actual depth that is added to the wall, roof, or ceiling cavity is the difference between dimension B and dimension D. The tolerances required to attain a proper fit are determined by the density and elasticity of the insulator material, as well as the widths of the arms 1215 depicted as dimensions E and F. Wider arms and higher density insulator materials generally require a channel width that is closer to the actual width of the framing member flange. Dimension A depicts the width of the insulator and making this width significantly greater than C allows these insulators to retain non-rigid cavity insulation materials in vertical and overhead application while eliminating the need for supplemental insulation brackets and furring strips.

Figure 12A:
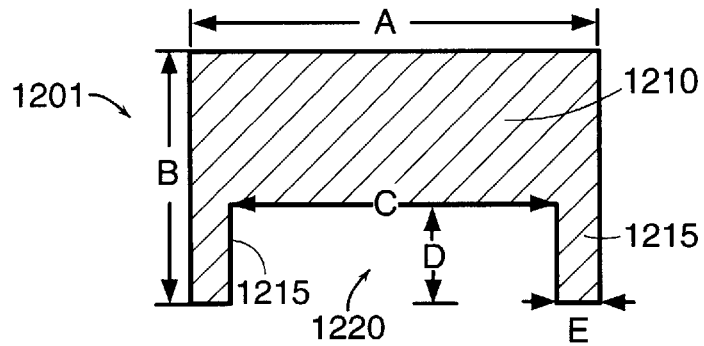
FIGS. 12A–12I are schematic friction-fit insulator cross-sectional profiles.
Figure 12B:
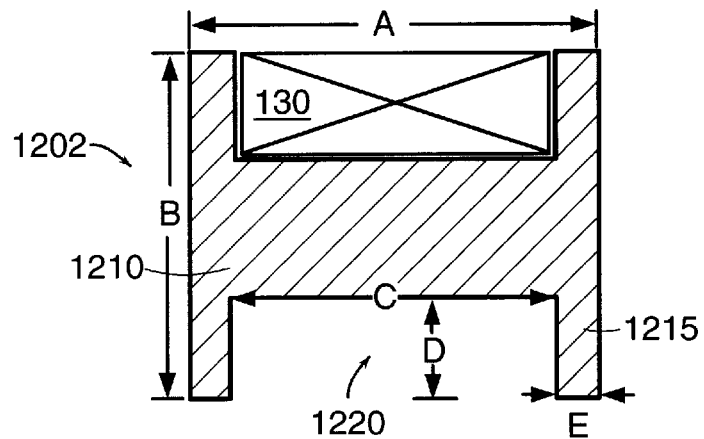
Figure 12C:
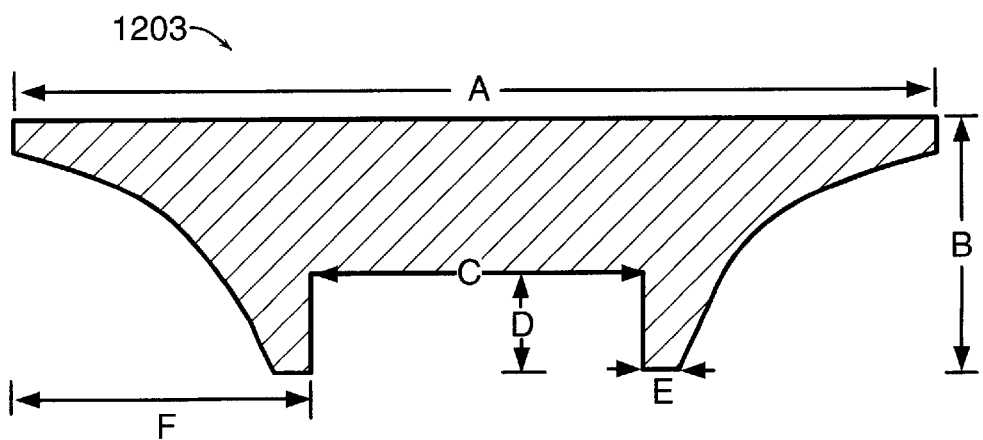
Figure 12D:
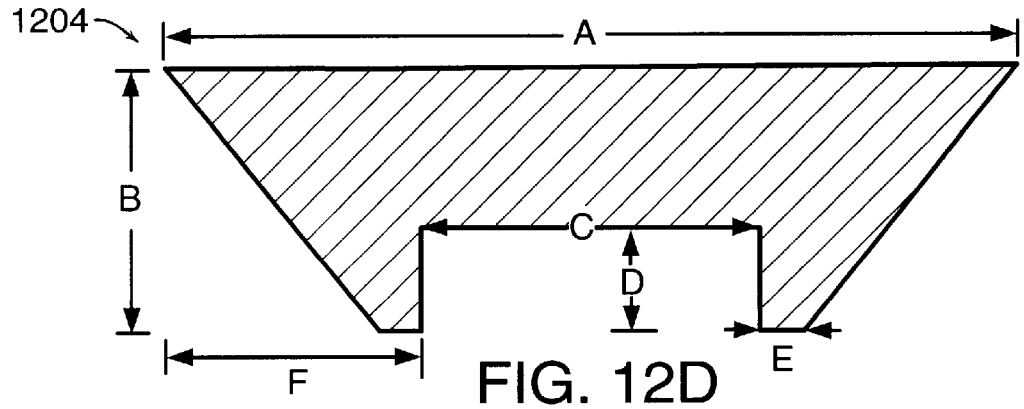
Figure 12E:
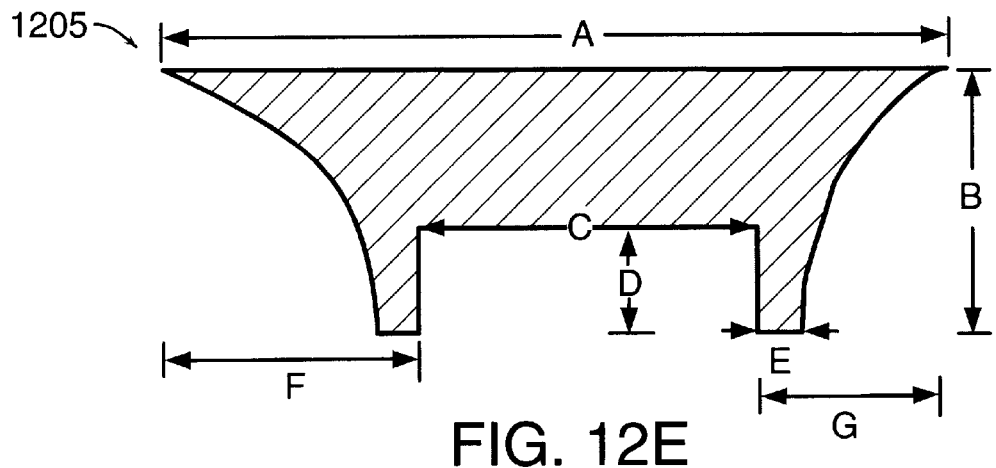
Figure 12F:
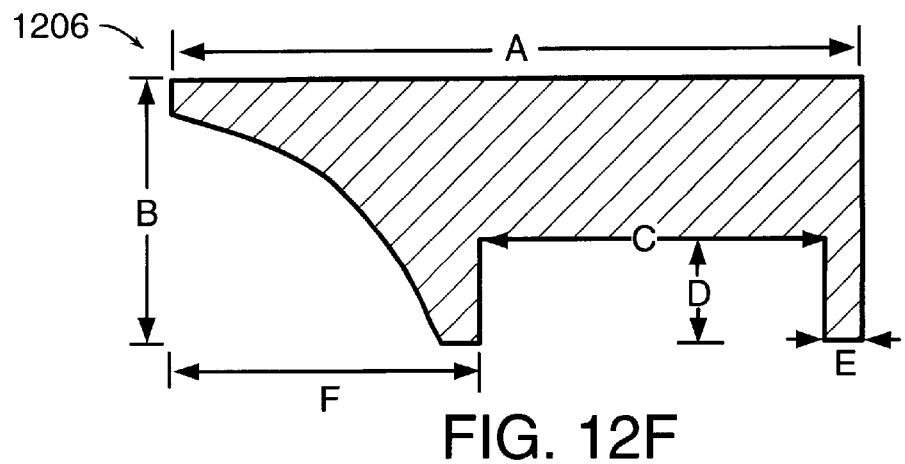
Figure 12G:
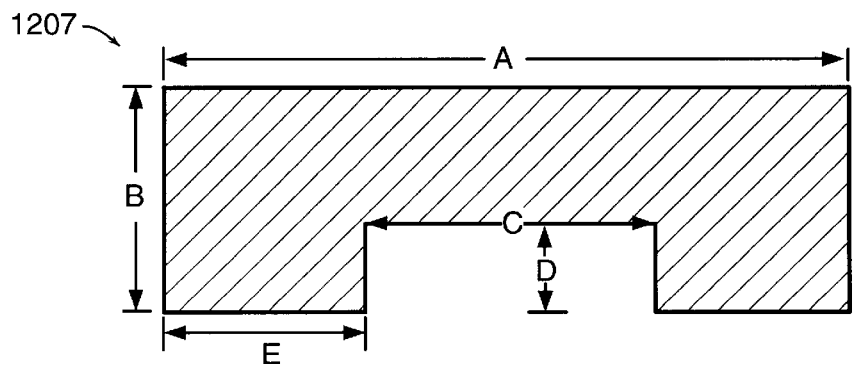
Figure 12H:
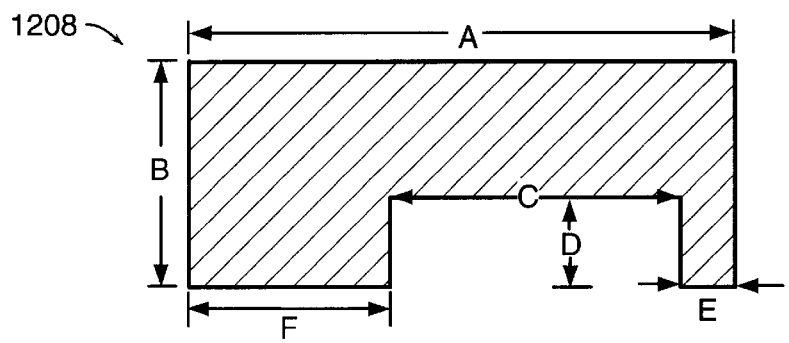
Figure 12I:
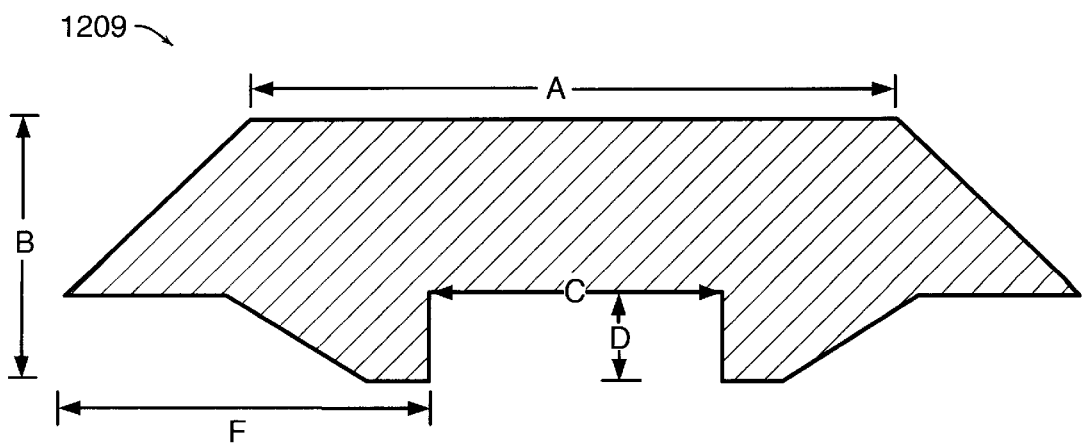

The profiles shown in FIGS. 12C–12I can be customized to suit the specific application, manufacture method, and distribution method. A contoured or winged profile as shown in FIGS. 12C–12F provides a smooth junction between the rigid insulator and the semi-flexible or flexible batt or blanket cavity insulation. The insulator of FIG. 12B is an H-shaped cross-section design that can accommodate two structural support framing members, one in each channel, or a higher density insulator or mechanical fastening member that is inserted into one channel in the H-shaped insulator such as member 130 shown in profile 1202. The rectangular profiles of FIGS. 12A–12B and FIGS. 12G–12H are easy to manufacture from rigid board stock, for example by milling the channels therein. The profile of FIG. 12I is an example of an insulator that can be used to create a planar air space in the cavity for insulation purposes or to be used as a drainage plane. The wings hold the non-rigid cavity insulation in place away from the sheathing, while the extra depth creates the air cavity. It may also be desirable to perforate the insulator along a longitudinal axis so that the flange of a vapor retarding facing paper on certain types of cavity insulation can be tucked into this perforation for retention purposes. Alternatively, any vapor barrier can be tucked under the wings, laid over the wings, or taped to an outer surface of the insulator.

Figure 13:
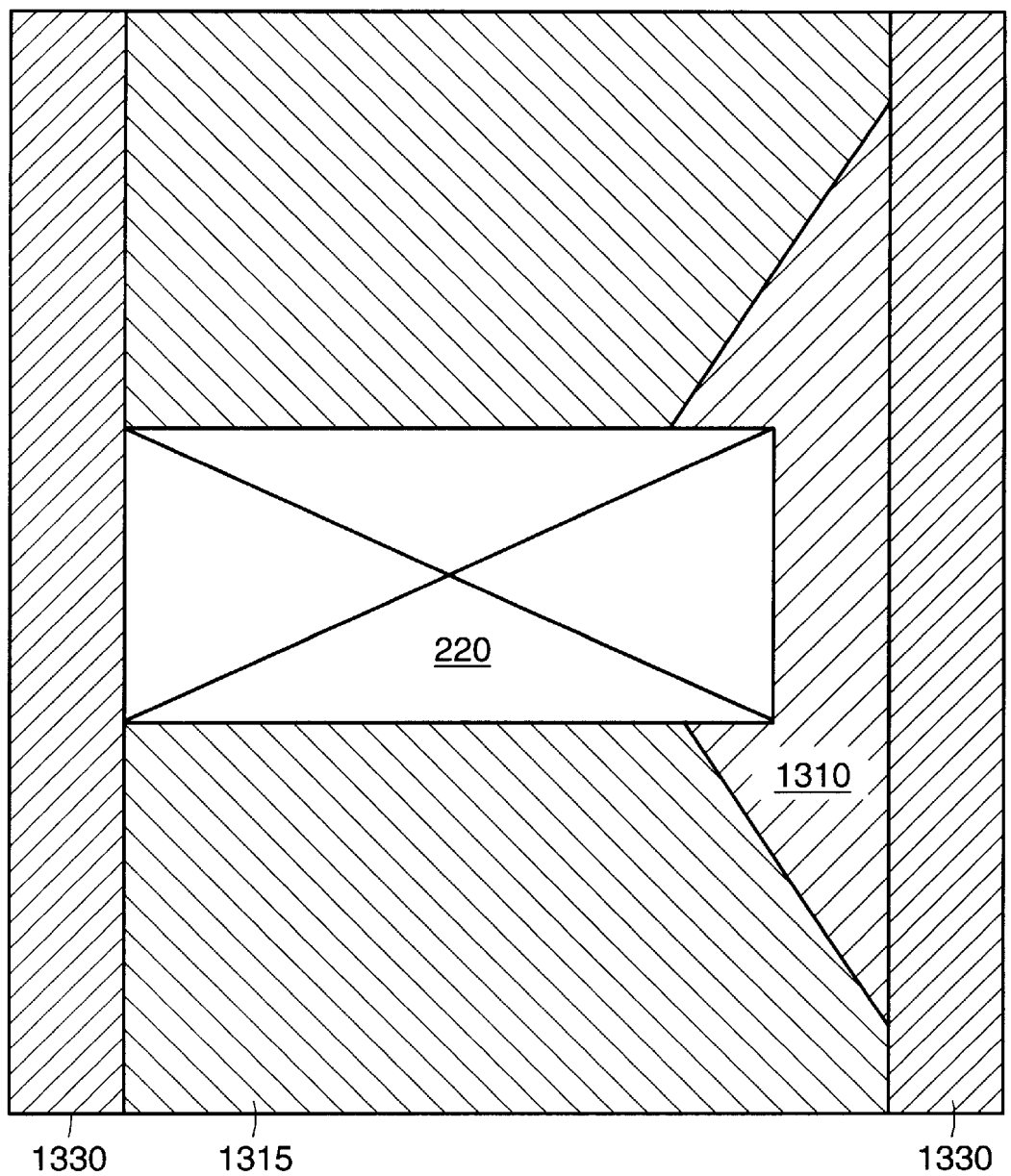
FIG. 13 is a schematic cross-sectional view of a wall assembly containing semi-rigid or flexible cavity insulation and a friction-fit insulator framing member with slanted wing profiles.

Referring to FIG. 13, depicted is a partial cross-sectional view of a wood (solid cross-section) framing member 220 with sheathing/wallboard 1330, cavity insulation material 1315, and an elongate insulating member 1310 having a cross-sectional profile of symmetrically slanted V-shaped wings. These slanted wings help prevent performance reducing voids from forming between the framing member 220, rigid insulator 1310 and sheet material 1330.

Figure 14:
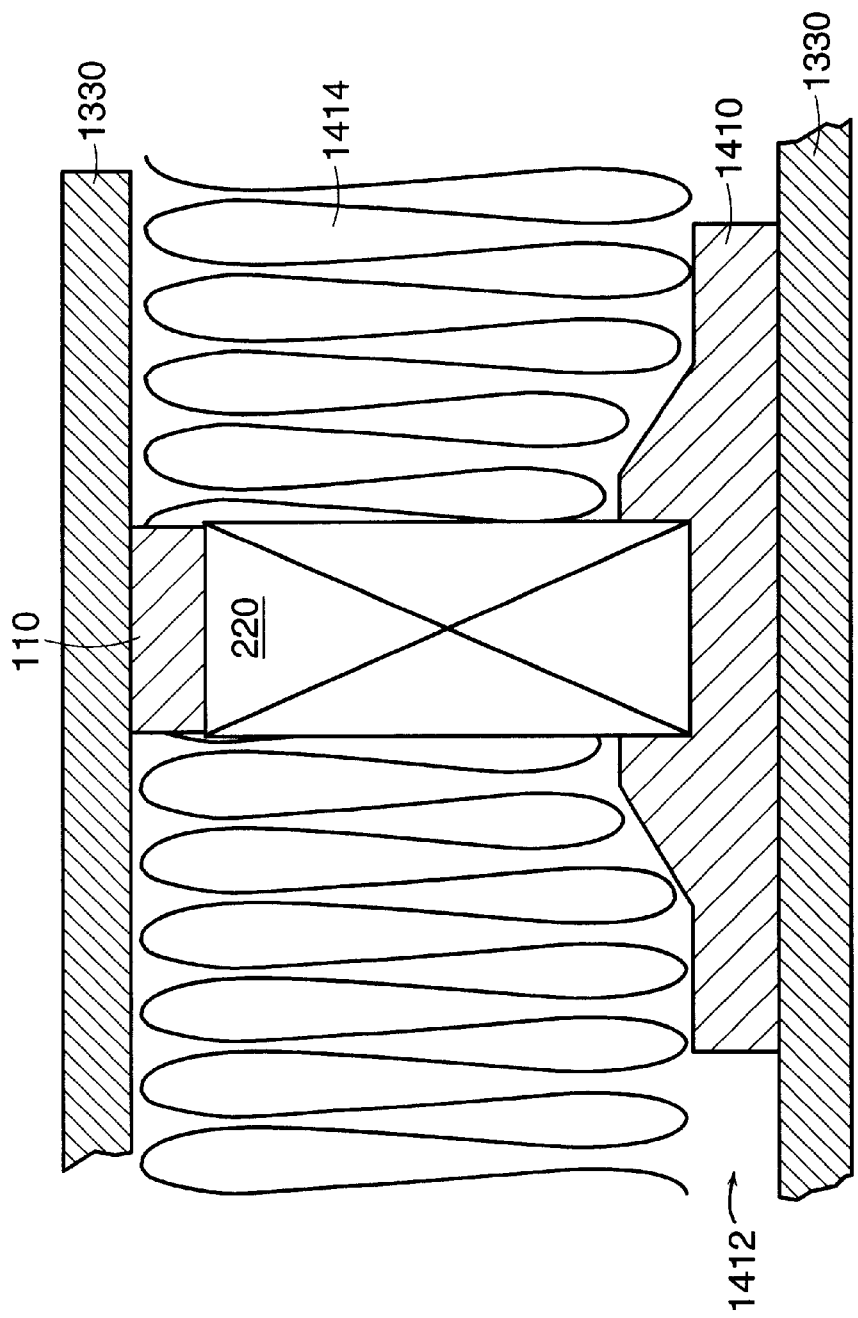
FIG. 14 is a schematic cross-sectional view of a wall assembly utilizing a double insulated solid wood framing member, non-rigid cavity insulation, and a low emissivity sheet product with a vertical insulating plane air space.

FIG. 14 is a partial cross-sectional view of a framing assembly that utilizes a planar air space. The wood framing member 220 is insulated on both flange surfaces with insulators 110, 1410. The shaped profile insulator 1410 holds the cavity insulation material 1414 in place, away from one side of sheathing or wallboard 1330. If either the surface of the wallboard/sheathing 1330 that faces this air space has a low-emissivity coating such as aluminum, or if the facer on the cavity insulation is a low-emissivity material such as aluminum, the insulating value of the planar air space 1412 is significantly increased.

Figure 15:
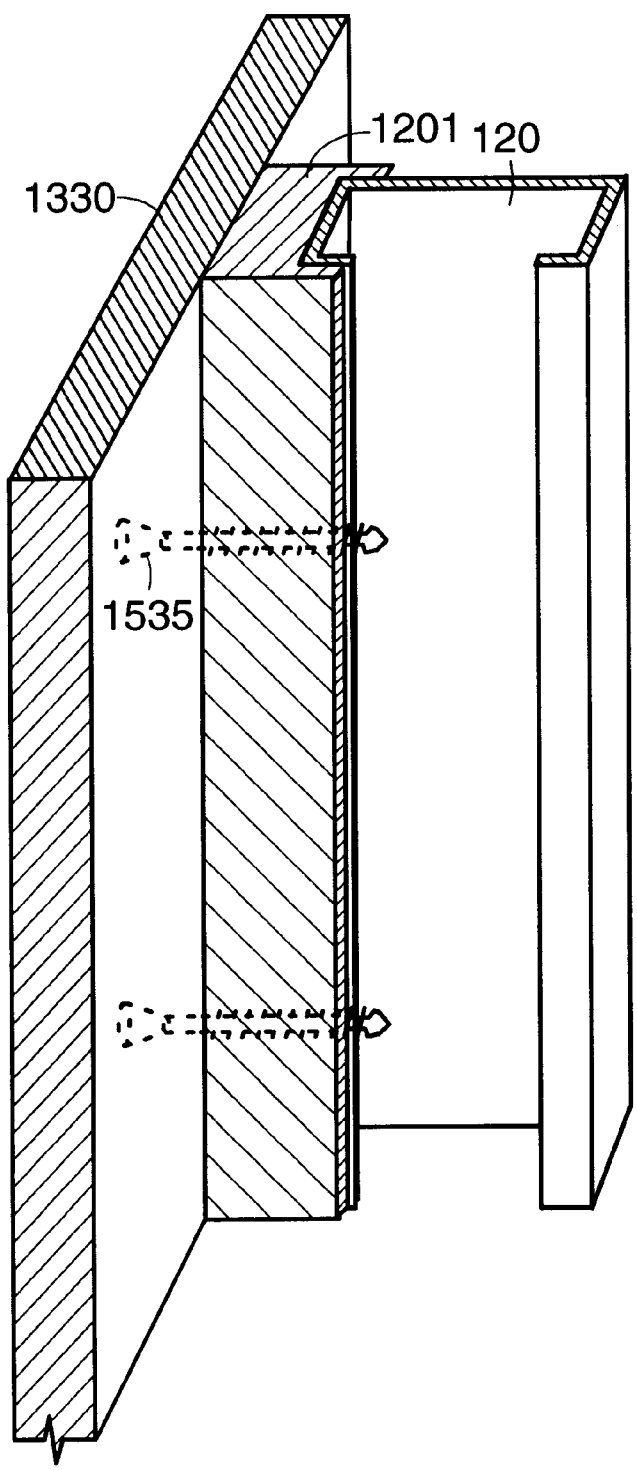
FIG. 15 is a schematic perspective view of a wall depicting the application of sheathing or wallboard over a friction fit insulator utilizing mechanical fasteners.

Referring now to FIG. 15, the friction-fit insulator 1201 becomes permanently mechanically fastened to the structural support 120 upon installation of the wallboard or sheathing material 1330 with fasteners such as screws 1535.

Figure 16:
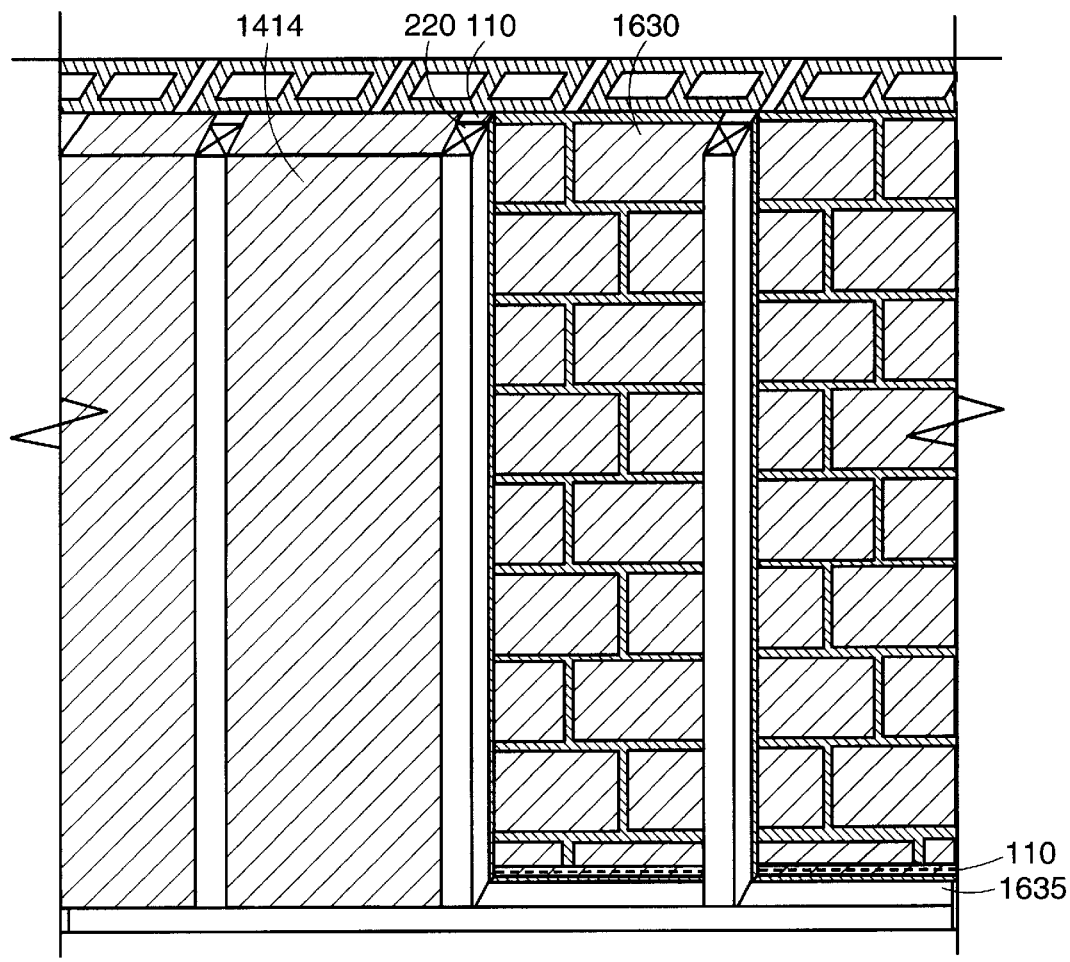
FIG. 16 is a schematic view of a masonry wall insulated with composite framing members.

FIG. 16 is a partial perspective view of a load bearing masonry block wall 1630 where wood framing members 220 with insulators 110 are used to frame wall cavities for use with nonrigid insulating material. The insulators 110 are placed between the framing 220 and the concrete block 1630 to eliminate thermal bridging. The bottom insulated wood composite plate is shown generally at 1635.

Figure 17:
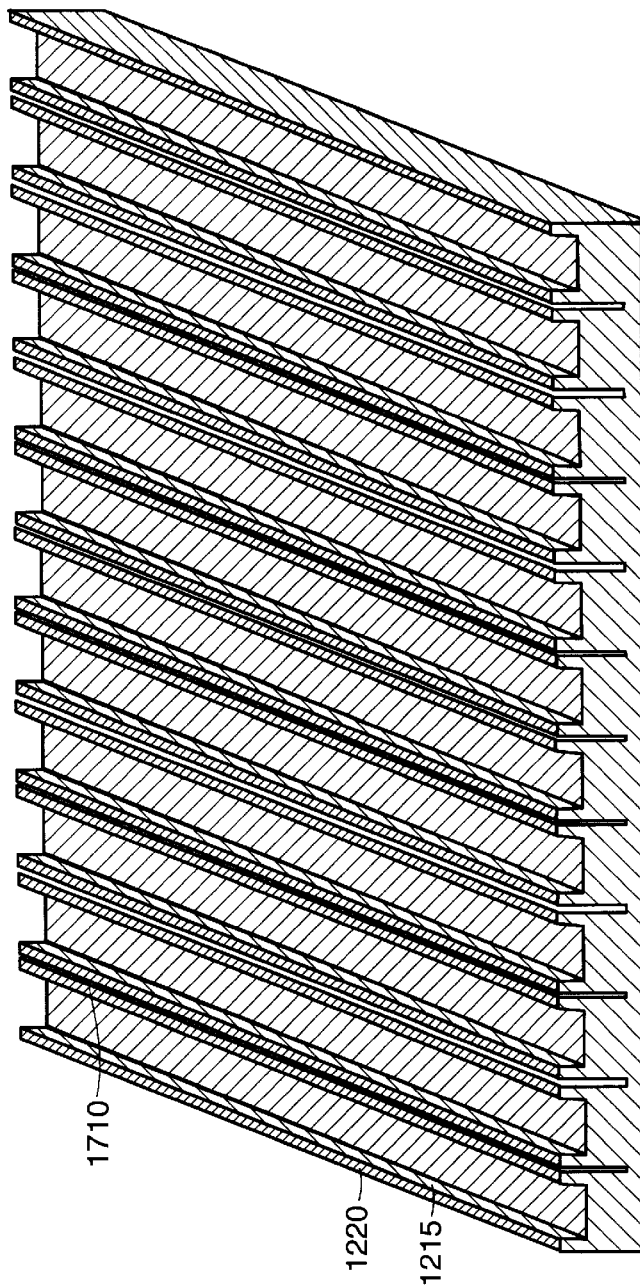
FIG. 17 is a schematic perspective view of a plurality of friction-fit insulators extruded or fabricated in board stock form, being scored or perforated along respective lengths to facilitate transport and separation of the insulators.

FIG. 17 depicts friction-fit, generally rectangular insulating members 1201 as produced and transported in an integral board form that can be extruded directly with channels 1220 and perforation lines 1710 formed in the extruded product. Alternatively, the channels 1220 may be fabricated out of rectangular profiled board stock or molded directly into the product, depending on the chosen insulator material and manufacturing volume. A perforation or scoring of the board is performed to achieve a partial disassociation of the individual insulator pieces 1201. This prescored board format reduces the amount of manufacturing and job-site handling costs per piece. At the time of use, the individual pieces are simply snapped off from the board.

Figure 18:
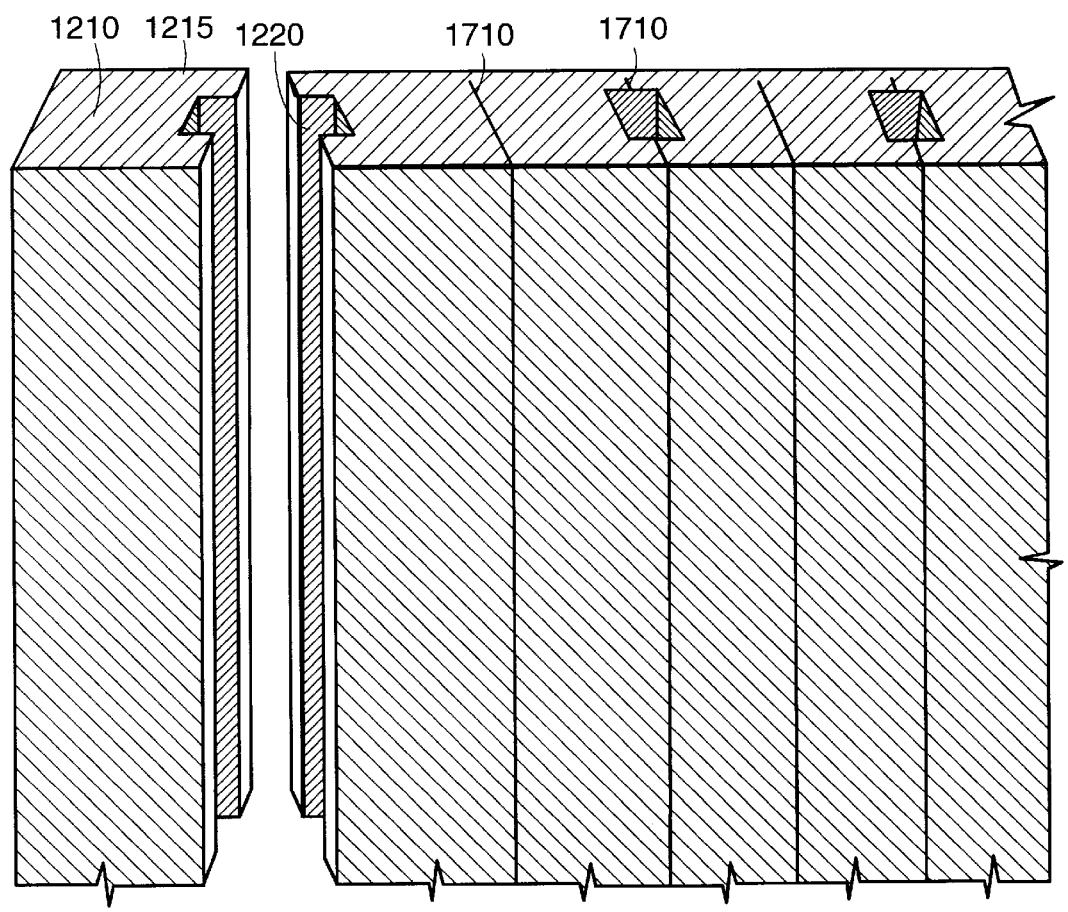
FIG. 18 is a schematic perspective view of a plurality of friction fit insulators according to an alternative embodiment of the present invention.

Referring now to FIG. 18, an alternative method of manufacturing the insulator board is depicted with the U-shaped friction-fit channels 1220 facing one another. Although the tooling to extrude or otherwise manufacture internal cavities in the board may be more complex, the advantage to this method of manufacture is that the friction-fit arms 1215 are better protected during handling, transportation, and storage of the insulators prior to installation.

Figure 19:
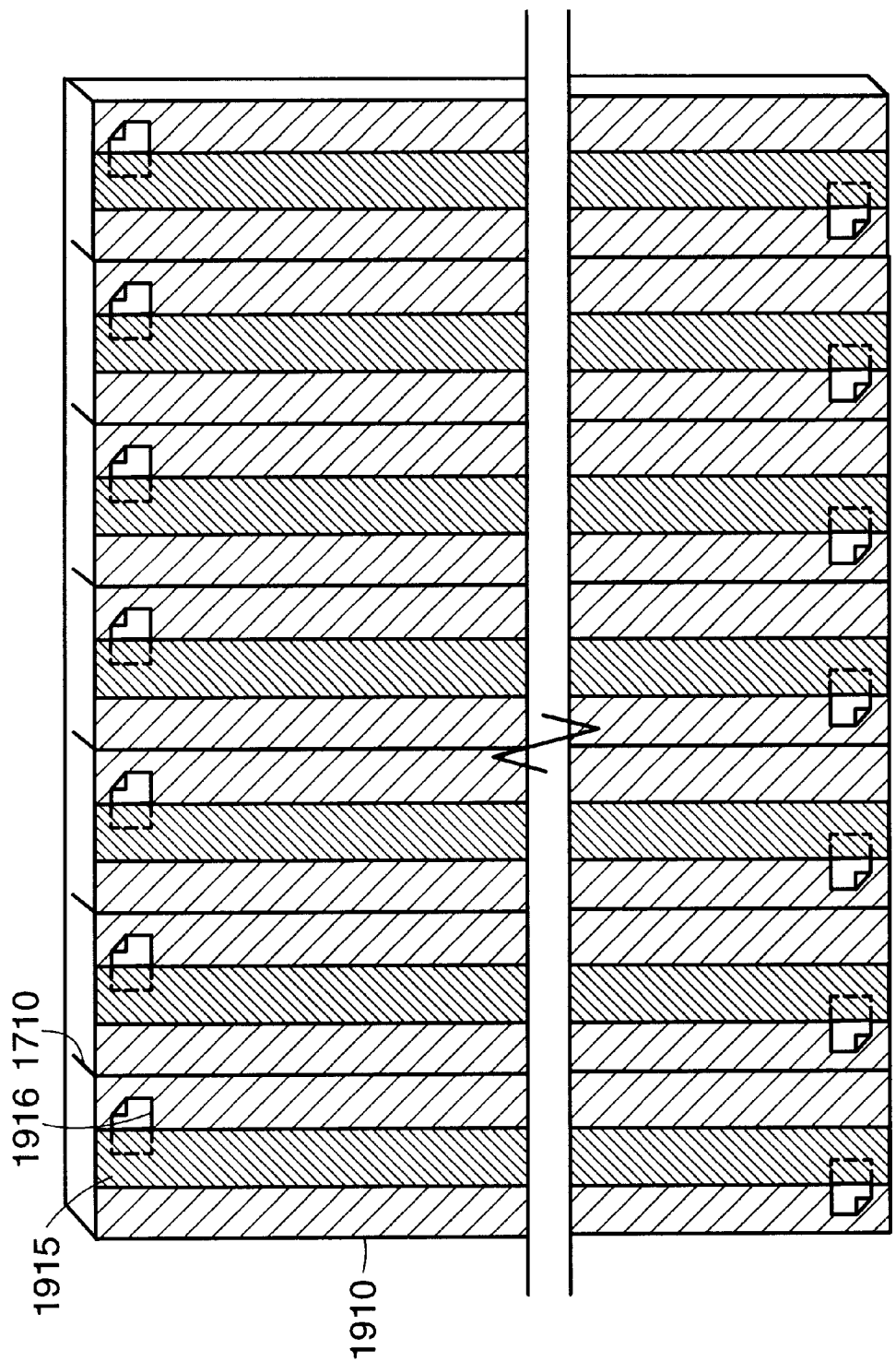
FIG. 19 is a schematic perspective view of adhesive backed insulators manufactured in scored board stock form.

FIG. 19 is a perspective view of a perforated board having a plurality of flat, adhesive-backed insulators 1910 having release liners 1915. The board is similarly partially perforated to facilitate handling, transportation and storage processes. Either a plurality of double-sided/adhesive transfer tape dispensing heads or an elongated multi-roll, single tape dispensing head can be used to simultaneously apply the adhesive strips 1915 to the board during manufacture. Pull tabs 1916 can be used to facilitate removal of the adhesive liner prior to installation. Alternatively, an extra wide liner may be employed.

Figure 20:
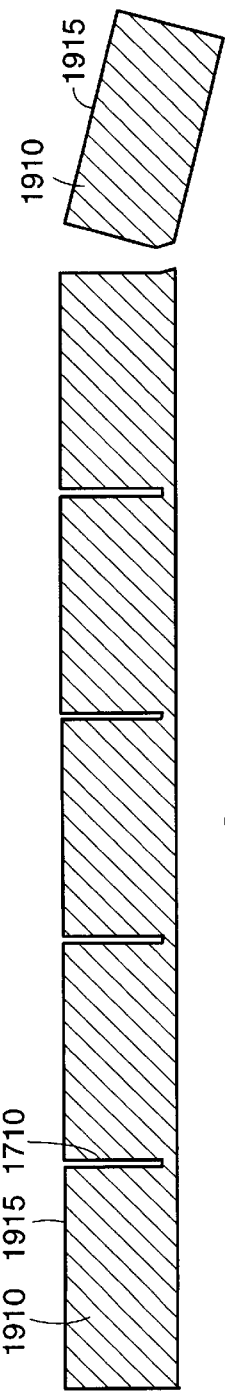
FIG. 20 is a schematic end view of the insulator board depicted in FIG. 19 showing removal of a single insulator along a score line.

FIG. 20 is a cross-sectional view of the pre-perforated flat insulated framing pieces 1910 of FIG. 19. A significant advantage of the pre-perforated flat embodiment is that the perforations can be spaced uniformly at small intervals such as 1.5 inches and the end-user (framer or insulating contractor) can then break off the widths needed for the various architectural framing details, such as 9 inches for a header beam 1040 or 3 inches for multiple members at jambs 1060.

Figure 21:
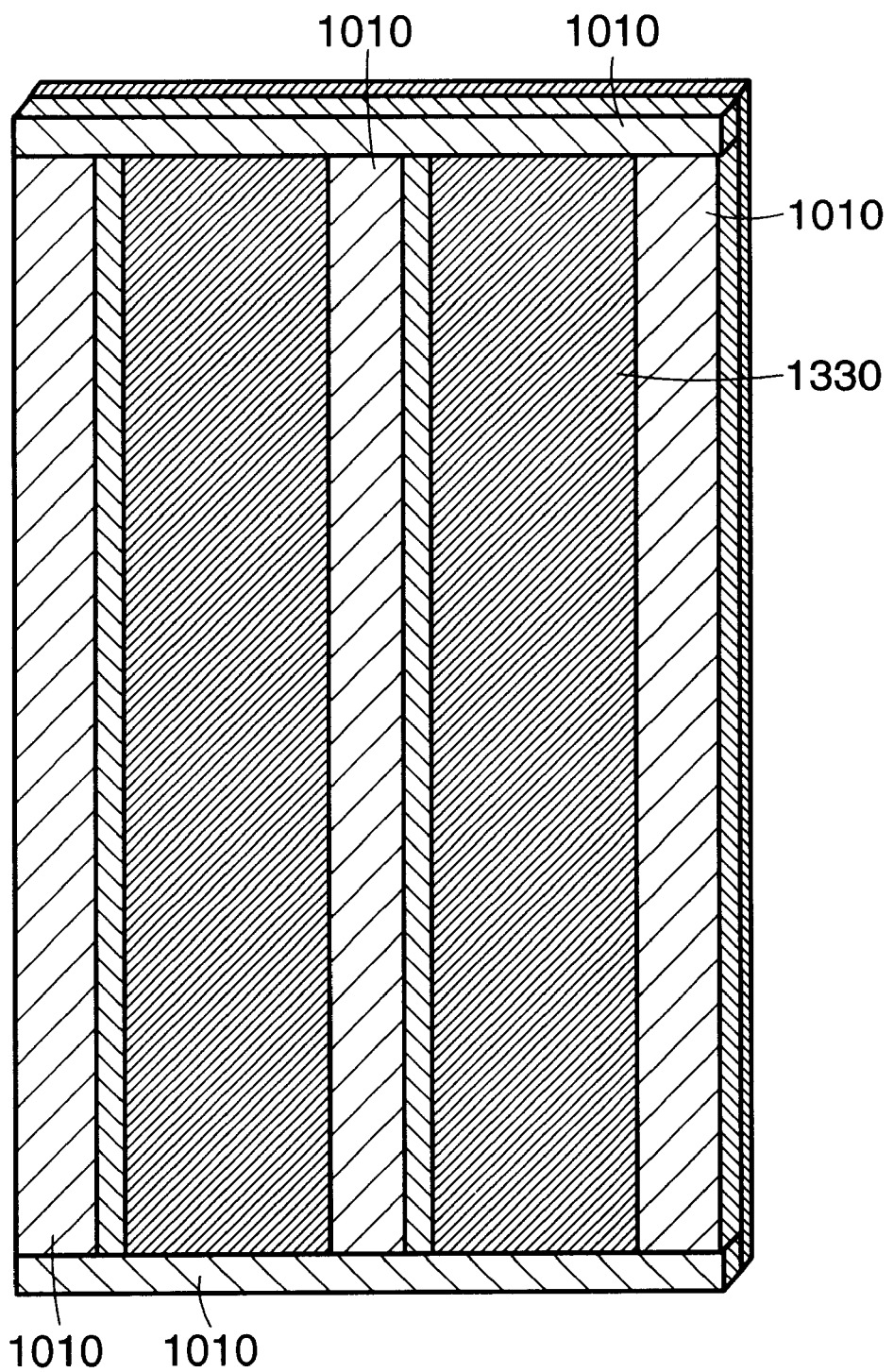
FIG. 21 is a schematic view of insulators applied to a sheet good such as gypsum wallboard or plywood sheathing.

Referring now to FIG. 21, depicted is a perspective view of flat insulators 1010 adhered or formed on a standard 4 foot by 8 foot or 4 foot by 9 foot sheet of either wallboard or structural sheathing 1330. The insulators 1010 are typically spaced either 16 inches or 24 inches on center to match the spacing of the building's framing member structural supports. This sheet is typically applied with the rigid insulation 1010 falling directly between the wallboard or sheathing 1330 and the framing members; however in certain applications, the uninsulated side of the sheathing may be directly placed against the framing members, leaving the rigid insulating strips exposed on an exterior surface of the building. According to this method, house wrap, stucco, cladding, or other exterior siding material in then applied directly on top of the rigid insulating members. In this application, the rigid insulators continue to act as a thermal break when positioned over the frame. The major difference is that lateral heat flow will occur in the sheathing layer between the framing and the insulators. For this reason, the rigid strips should be somewhat wider than the flange width or surface area of the framing members. The performance of this technique is improved by placing an air barrier exterior to the rigid insulating strips. Examples of methods to create this air barrier are utilizing a housewrap with taped seams, stucco plaster, or foil-faced insulative sheathing with taped seams. This results in the mitigation of thermal bridging while creating planar air spaces of uniform thickness that also contribute to the overall thermal resistance of the building system. One difference between the alternative air sealing methods is vapor permeability. A typical housewrap and stucco application is permeable to water vapor while insulative sheathing is not.

FIG. 22 is a schematic view of a semi-flexible or flexible cavity insulation material 1414 that is longitudinally perforated 2215 approximately one flange width distance (1.625 inches, for example) in from one edge to accommodate composite C-section framing members or other framing cross-sections which include inwardly projecting lips. This modification has large consequences for the thermal performance of assemblies utilizing this type of cavity insulation with C-section framing members such as light gauge steel framing. To perforate the batts in the field at the job site is labor intensive and imprecise. To accomplish this at the time of original manufacture however, can be cost-effective.

FIG. 23 is a cross-sectional view of a single building envelope cavity. A flexible or semi-flexible batt/blanket 1610 is used to fill the bays between the C-section framing members 120. The C-section framing members have stiffening bends running perpendicular to the planar flange surfaces that are referred to as lips 2220. The ninety-degree angles at the lips pinch the batt/blanket 1610 leading to air-gaps 2240 surrounding the lips 2220. These air-gaps can lead to a phenomenon known as "convective looping" where the air currents diminish the effectiveness of the cavity insulation material. The average size of the air-gaps is increased when higher density, less flexible batts are used and also when an insulating member 110 extends the distance between the point of the lip 2220 and the wallboard or sheathing 1330. This problem can be substantially eliminated by using the preforated batt 1414 of FIG. 22 as depicted in FIG. 24.

FIG. 24 shows how the perforations 2215 in the semi-flexible or flexible batt/blanket 1414 allow the fibrous material to completely fill the right angle geometry formed between the lip 2220 and the flange of the C-section stud. The air gaps are minimized and therefore the performance of the batt/blanket is maximized.

Figure 25A:
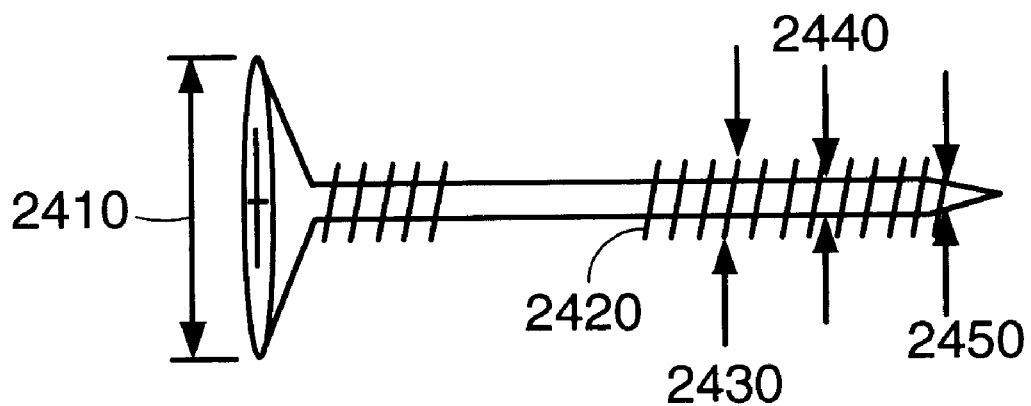
FIGS. 25A and 25B are schematic views of a mechanical fastener and enlarged portions of alternative thread profiles for use in shear wall assemblies with insulated framing members.
Figure 25B:
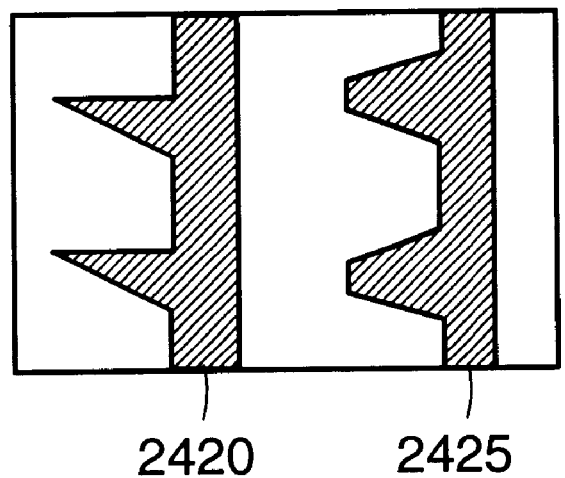

FIGS. 25A–25B are schematic illustrations of fastener and thread details useful in shear wall assemblies with insulated framing members. In this application, the structural sheathing is fastened to the framing members through a given thickness of rigid insulator. By expanding the bearing surface area of engagement between the fastener and the structural sheathing, a larger than conventional diameter fastener head 2410 acts to stiffen the assembly. This helps to compensate for the leveraging or cantilevering that occurs across the generally unsupported fastener length passing through the insulator. This leveraging can amplify pull-out, turning, and bending forces at the connection between the framing member and the mechanical fastener. Further, it is desirable that the diameter of the fastener point 2450 be smaller than the minor diameter 2440 of the fastener shank. This ensures a tight engagement between the fastener and the framing member.

Another factor influencing the pullout value of a threaded fastener is the depth of the thread (i.e., the difference between the outer thread diameter 2430 and the minor shank diameter 2440). In general, the larger the difference, the greater the pullout resistance. Further, tooth profile is important. FIG. 25B compares the profiles of a standard screw thread 2425 and a modified buttress thread 2420. The modified buttress thread has a steeper thread with almost a flat top surface, versus the nearly symmetrical top and bottom slopes of the standard screw thread profile 2425. This design contributes to greater torque resistance to loosening as well as higher pullout values.

Figure 26A:
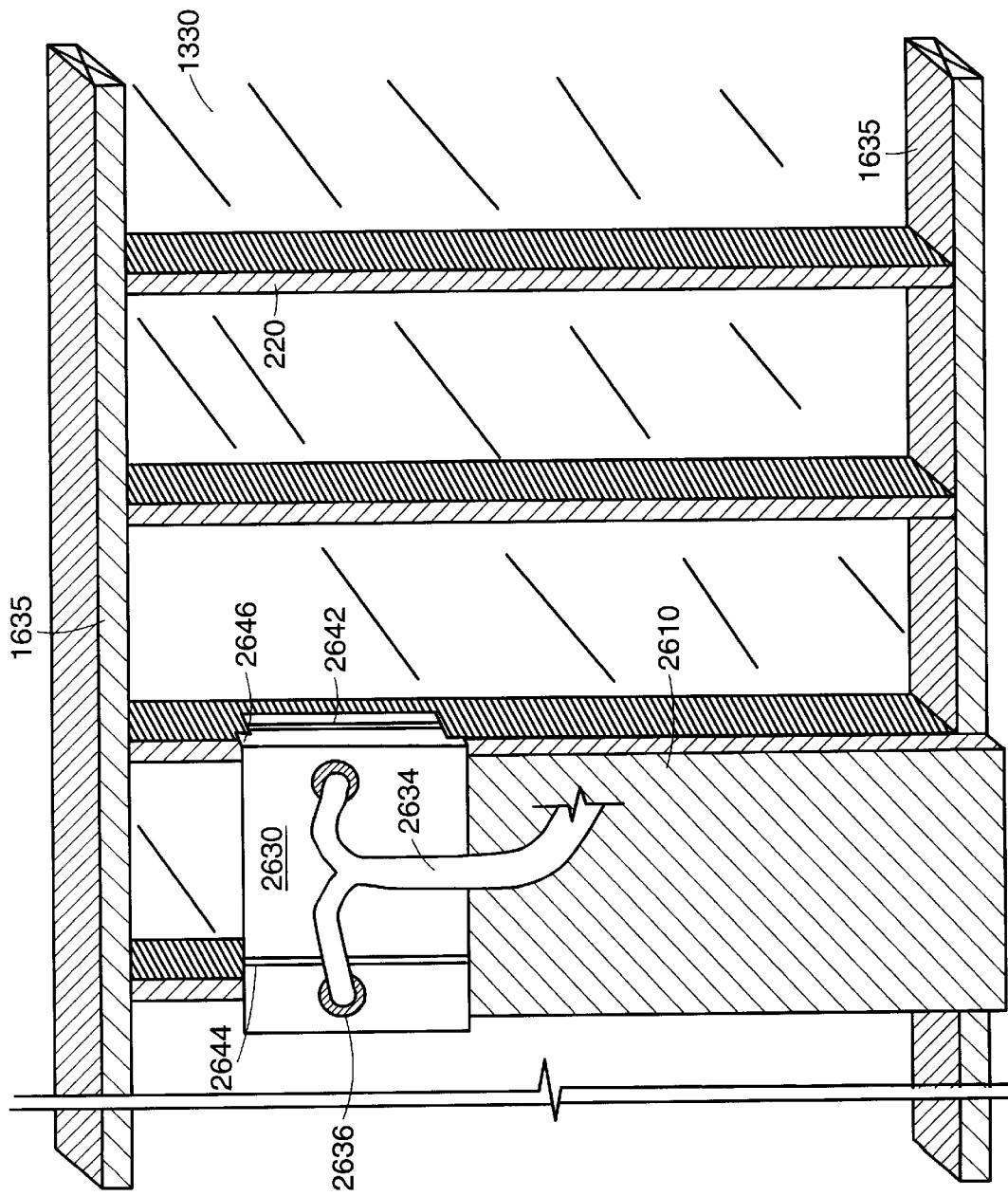
FIGS. 26A and 26B are schematic perspective views of an apparatus for the formation of insulated framing composite members in situ while filling the building envelope cavities with insulation material.

Referring now to FIG. 26A, depicted is a perspective view of wall section being insulated with a sprayed in foam insulation mixture 2610. The wall is sheathed 1330 on the exterior surface of the wall. The wood studs 220 and plates 1635 are being insulated in situ. An adjustable tamping plate applicator 2630 is used to form an insulative thermal break layer of uniform thickness over the framing members. It provides a reaction plane for the formation of the insulation material. The inside surface of this applicator plate may be covered with a low friction material like tetrafluoroethylene. An operator moves this applicator plate 2630 by holding the supply hose 2634 that delivers the insulating foam mixture to one or more spray nozzles 2636. The width of the plate is adjustable 2644 to accommodate both standard and non-standard stud spacing. The thickness of the applied insulation system is controlled with the tamper-applicator depth adjustment 2642. The four corners 2646 of the applicator are coped along the depth projection to accommodate both single and double, top and bottom plates of the framing assemblies. The depth adjustment guide travels along the surface of the sheathing to ensure control of the total thickness of rigid insulation applied to the framing members and the cavity. With this technique every other stud, ceiling, or roof bay is initially insulated. Each pass of the tamping-applicator insulates two framing members at once. After this process is completed, the remaining bays are filled with either a flat tamping plate that does not include the depth guides, or with the supply hose alone.

Figure 26B:
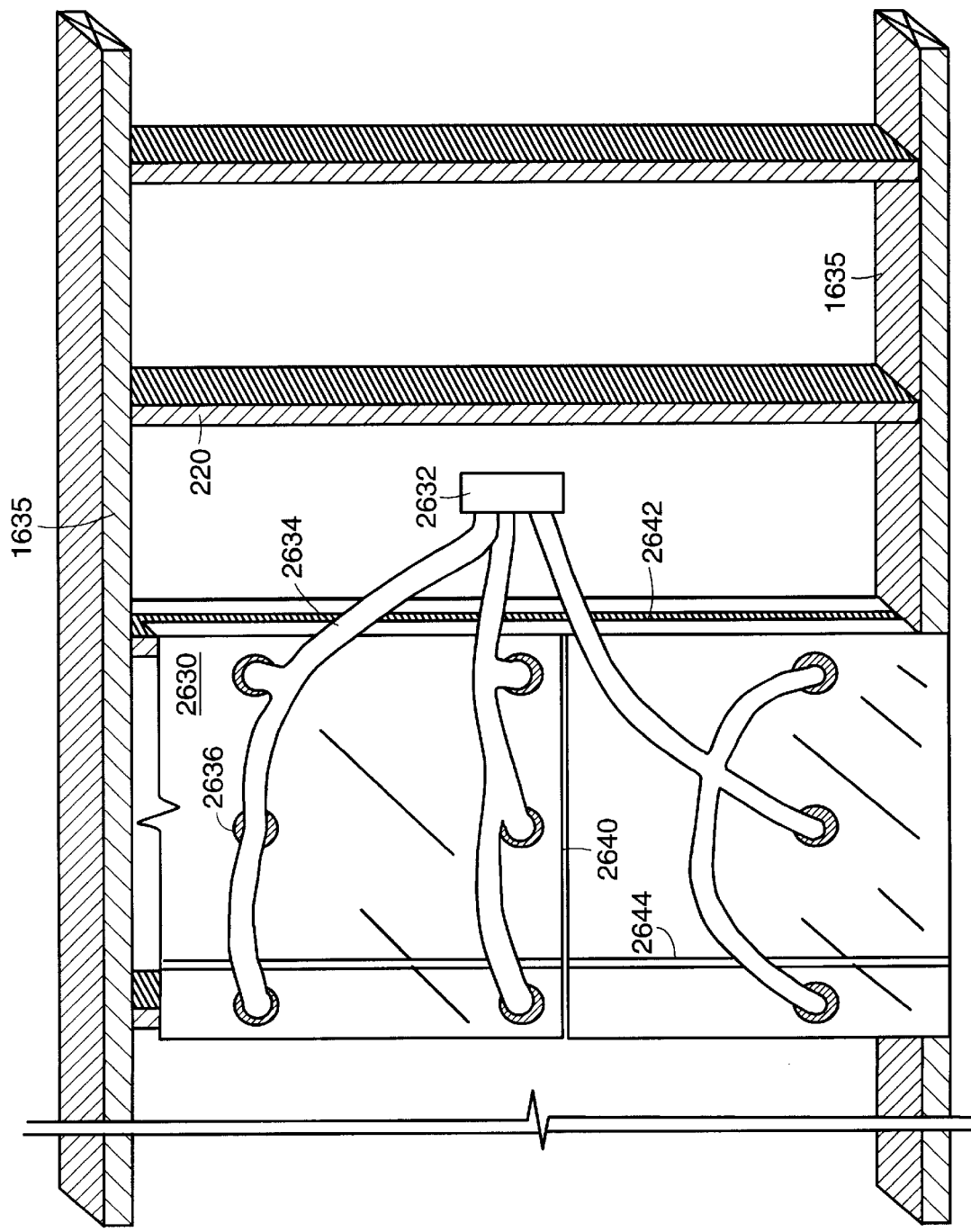

Lastly, FIG. 26B is a partial perspective view of an adjustable full-height stud bay insulation applicator. The back surface of these framing bays are also sheathed for this application. A manifold 2632 is utilized to distribute the insulation mixture to a plurality of spray heads sufficient to evenly fill the entire framing bay. A height adjustment 2640 is also provided to enable the apparatus to insulate cavities of various dimensions.

The benefits of the insulated framing system may be achieved in a variety of ways. For example, insulated framing composite members may be produced either in a factory or at a job site. Alternatively, friction-fit or adhesive-backed insulators can be readily applied during envelope construction either in the factory or field. The insulated framing composite member is a union of a construction industry accepted framing member or structural support with a rigid insulator attached to one or both of opposed edges or flange surfaces disposed generally perpendicular to a predominant direction of unidimensional heat conduction through the building envelope. Composite members may also be used to prevent thermal shorts, for example along an interface between a top-track of a wall and a roof truss in a metal framed building. The system according to the teachings of this invention may be used to insulate substantially an entire building frame, including structural elements such as floors, walls, corners, ceilings, roofs, and junctions or joints formed therebetween.

The rigid insulators attach to the primary load bearing structural supports of the building. These supports are generally either framing members made of materials such as wood, laminated veneer lumber, engineered wood products, metal, polymer, plastic, wood-steel, or other structural composite members or load bearing masonry construction such as brickwork, blockwork, stonework, and cast concrete. For thermally insulated framing composites, the insulator provides sufficient compressive resistance so as to maintain a thickness necessary to preserve the conductive thermal resistance for the designed application. For acoustic insulated framing composites, the insulator is elastic and the installation is designed to maintain the elastic properties of the insulator. In an insulated framing composite, the primary axial, flexural, and other structural properties are provided by the structural framing member, whether manufactured of wood, metal, plastic, etc. The insulator component provides physical properties that allow it to act a web for the resistance of compressive loads and the transmission of shear loads imposed by wind and seismic forces between the sheathing and the structural framing. The insulator is composed of a core insulating material and a means of fastening the insulator to the structural support so as to facilitate installation. A structural facing member or structural spacing pegs may be attached to the insulator in specific applications, for example to provide a nail-base for cladding and fenestration decorative detailing. The invention enables builders to reduce thermal bridging effects through the load bearing structural supports and through joints between structural elements of the building. By reducing the thermal bridging effects and increasing the volume of cavity insulation, enhanced thermal insulation is achieved. The invention enables builders to increase the depth of wall and roof cavities by effectively extending the thickness of the structural supports. The increased cavity depth facilitates installation of greater quantities of insulation material. The insulated framing works together with the cavity insulation to achieve insulation and economic benefits related to labor and materials.

The insulators may be applied to one or both sides of the structural supports. For structural supports that have open interior voids such as C-shaped metal studs, stud flanges need only be insulated on external surfaces. For example, an insulator may be provided by using a polyurethane foam coating of about 1/64 inch or greater in thickness. Optimal thickness will vary by application needs and other construction details. Density and thickness will vary based on other criteria as well, such as shipping, handling, and compressive strength requirements.

Substantially flat, planar insulators may be applied to the structural supports quickly, using adhesives. Adhesives may also be used to apply the sheathing or wallboard, thereby avoiding thermal and acoustic transfer through mechanical fasteners. Such techniques also reduce installation labor and help to optimize the distribution of high density structural supports. Alternatively, the insulators may be contoured, having one or more side wings, flanges, or other structures to provide increased area for adhesion or a mechanical friction-fit with the structural support. Accordingly, a cross-section of the insulator may be somewhat U-shaped or C-shaped, having a channel formed therein. The adhesive or friction-fit need only be sufficient to maintain the integrity of the composite member until the sheathing is installed, for example with mechanical fasteners such as nails, screws, staples, etc. The friction-fit arms typically run parallel to opposite sides of the structural support, thereby providing additional resistance to lateral heat flows. Furthermore, the arms effectively make the structural support into an I-beam, thereby facilitating the friction-fit installation of flexible and semi-flexible batt or blanket types of insulation, eliminating the need for stapling the batts to the framing members or the use of insulation brackets.

Shear-wall strengths that are comparable to conventional assemblies with uninsulated framing can be achieved by increasing the fastener wire size at the identical fastener spacing schedules. The increased wire diameter compensates for the unsupported length of fastener passing through the thickness of the insulator. Further, the insulator may act to increase the ductility to the wall assembly. One method of controlling the stiffness is to increase the diameter of the fastener head.

In the context where the insulator does not provide sufficient structural resistance to compressive, flexural, wind uplift, racking or other normal building loads, the insulator can be strengthened by integrating therein a plurality of structural spacing pegs, a rigid nailing surface, or both to enhance the structural integrity of the insulator and provide resistance to such loads. The structural spacer pegs and the rigid nailing surfaces are elements that, independent of the proposed insulator attachment method, could be utilized to improve the performance of rigid insulation board sheathing. In this capacity, these elements would provide the same functions as for the insulators, for example, enhanced compressive resistance, nailing surfaces, thermally broken screw or nail wallboard attachment means, etc. The peg shape may be used to optimize the tradeoff between structural stability and thermal resistance to heat flow. Two embodiments are a T-shaped peg, where the top of the T anchors the peg, and a cylindrical shape such as a short pipe section.

To accommodate applications where the insulator member is manufactured from a moisture resistant material, such as expanded polystyrene, and a vapor permeable interface with the structural support is desired, the insulator can be designed in such a manner that the insulator is separated from the structural support by a small, insulating air gap (for example, ¾ inch or less) or by a similar thickness of a vapor permeable material. In this embodiment, spacing pegs would typically continue to run through the entire thickness of the insulator.

The insulators effectively break the thermal link between the interior building thermal environment and outdoor conditions, without sacrificing the structural integrity of the wall construction, interior surface treatments, and exterior sheathing. Further, the insulators can be manufactured from materials which are optimized to either provide a vapor barrier or a moisture permeable interface at the framing member. Useful materials include polyurethane, polystyrene, other rigid foamed plastics, wood, wood composites, and other cellulosic materials such as compressed agricultural fibers. The net effect is that a building can achieve higher overall resistance to heat flow through thicker, better insulated walls using structural supports that are sized for the building's structural loads rather than for the thermal loads. For example, a two-inch thick insulator can be combined with smaller dimensional lumber, such as a 2×4 stud, to achieve 2×6 cavity insulation capacity as well as reduced thermal bridging through the framing. With approximately three basic insulator geometries (U- or C-shaped, L-shaped, and flat), all of the structural framing members in a building can be extended. This includes double or triple framing around doors, windows, plates, sills, shoes, bucks, headers, studs, joists, rafters, corners, wall/ ceiling joints, and wall/floor joints.

An inherent commercial advantage of this building system is that the rigid insulators are fully compatible with non-rigid types of insulation such as loose fill, batt, and blanket products. This system allows the builder to reduce the material and labor costs associated with thicker framing members (wood in particular) and rigid insulation sheathing, as full panel rigid board insulation is much more expensive than the non-rigid insulating materials that can be used to achieve equivalent thermal performance. Further, this system is fully compatible with all framing materials (wood, metal, plastic, composite, etc.) and cross-sectional shapes (rectangular, C-shaped, triangular, etc.).

One object of this invention is to replace the two most common techniques for improving thermal insulation performance of a building, namely the use of a continuous layer of rigid foam board sheathing, generally used to wrap the entire surface area of a building's exterior structure including walls, roofs, cathedral ceilings, etc. and the use of thicker framing members than are necessary for structural purposes to increase cavity volume and permit the use of more cavity insulation, for example, using 2×6 framing members (5.5 to 6 inches deep) in place of 2×4 framing members (3.5 to 4 inches deep).

By using composite members having both a structural function and an insulating function, an easy to install, cost effective thermal barrier can be provided. According to one embodiment, insulators may be manufactured from extruded polystyrene as a set of preperforated, flat shapes that come in rigid foam board stock. The board may be adhesively backed and include a release liner strip. In the field, a framer need only break off the width of insulator required, for example a 1.5 inch width to insulate a single 2×4 stud or any multiple thereof to cover wider areas as necessary for other framing details. The release liner strip is peeled off and the insulator is applied to the structural support of the exterior frame. Wallboard, plywood, or oriented strand board sheathing may then be applied over the insulators, as with conventional construction techniques. If desired, an additional continuous layer of rigid insulation sheathing may be added for further thermal protection.

For attachment to structural supports such as framing members, the initial installation of the insulator is facilitated by either a mechanical friction-fit design, an adhesive binder, or a combination of both methods. The mechanical means is embodied by flanges or arms (U- or C-shaped) to provide a friction fit installation. These flanges or arms may be integral with the insulator or they could be separate pieces such as plastic U-shaped clips. In most cases, the friction attachment is an interim installation that would be further secured by mechanical fasteners such as nails, screws, staples, etc. passing through the sheathing or wallboard. The friction-fit arms run parallel to the interior sides of the framing member, thereby providing additional resistance to lateral heat flows. Furthermore, the arms act as a cap on the end of the framing member, increasing the effective width at one end. This increased width facilitates the friction-fit installation of flexible batt or blanket types of insulation in the cavity, thereby eliminating the need for secondary support of the batts such as stapling to the framing members or the utilization of insulation retaining devices. The insulator can also contain one or more longitudinal slots in the surface to receive the flanges of a vapor retarder often found on flexible batt type insulations such as polyethylene. Alternatively, the face can be coated with adhesive backed liner or double-sided tape to facilitate installation of the vapor retarder. These insulators may be formed on or attached to one or both ends of the framing member. There is, however, little thermal, acoustic, economic, and labor benefit to extending the insulator along the depth of the framing member.

In applications where the insulators are being applied directly to load bearing masonry construction without intervening wood, plastic, metal, or composite framing members, a preferred embodiment will typically not have the friction fit arm design. Instead, a structural facing member may be attached on the side opposite from the first one. This second facing member can include lateral flanges to facilitate rigid attachment to the masonry using common techniques.

In the situation where the insulator does not provide sufficient structural resistance to anticipated static and dynamic compressive building loads, the insulator can be strengthened by integrating a plurality of structural spacing pegs, a rigid nailing surface, or both into the insulator to provide the desired resistance to these loads. This facing member may be attached to the insulator using either a structural adhesive or an interlocking mechanical design. The facing member forms an adequate substrate for attachment of finishing materials by either mechanical or adhesive methods. The finishing material is generally a protective fire barrier for interior surfaces, for example ½ inch thick gypsum wallboard to provide a minimum fifteen minute thermal barrier for interior applications, or sheathing, siding, or cladding for exterior surfaces. The insulators effectively break the thermal link between the interior building thermal environment and the outdoor condition without sacrificing the structural integrity and fire resistance of the envelope construction. Selective choice of the insulating material can be optimized to either provide a vapor barrier or a moisture permeable interface to the load bearing structural supports. The net effect is that a building can achieve higher overall resistance to heat flow through a thicker, better insulated thermal envelope using load bearing structural supports that are sized for the building's structural loads rather than for the thermal loads.

This system is an improvement on previous thermal break techniques in that it provides several new and useful ways to create and install the insulated framing composite, teaches how the insulated framing composite can be used in shear wall assemblies, can be used for acoustic insulation purposes, can be profiled to better accommodate non-rigid cavity insulation (batts and blankets), achieves air-sealing benefits over joints, can be effectively placed between framing and sheathing where it impacts the minimum number of building trades, can be produced inexpensively and applied to all the architectural details of the building envelope, and can accommodate non-rigid cavity blankets and batts.

By using an adhesive backing, the insulator can be placed on either side of a vapor retarder, if one is used. Further, by employing a second adhesive layer opposite the first, the insulator can be mounted on the structural support and a vapor retarder such as a polyethylene sheet can be stuck to the insulator.

Using adhesive-backed or friction-fit framing insulators that are wider than the framing member flange creates an insulated frame that can support non-rigid insulation in the cavity. An example of this is using a 3-inch wide insulating member on a 2×6 stud which has a nominal width of about 1.5 inches. This is particularly useful for overhead insulation applications such as in a cathedral ceiling. The rigid framing insulators hold the non-rigid insulation in place while the wallboard, interior cladding, fire barrier, structural sheathing, or other surface finish materials are applied. This holding action eliminates problems associated with non-rigid cavity insulation falling out of or slumping in the cavity. Conventional framing requires insulation clips or wood or metal furring be applied.

Adhesive and friction-fit insulators eliminate the need for interim mechanical fasteners. Thermal bridging effects are avoided by using a high performance structural insulator material such as polystyrene. The system is also useful for acoustic bridging applications, for example between drywall and ceiling joists between floors in multi-family construction and/or between a subfloor and floor joists to eliminate squeaking that can occur at steel-to-steel interfaces. In acoustic applications it is advantageous to use a flexible, open-celled structure that is ideally air-permeable such as a resilient spongy agricultural fiber/binder composite or an elasticized, spongy expanded polystyrene material.

The insulators can have any of a variety of cross-sectional profiles. For example, using wedge or otherwise contoured profiles along the depth dimension of the insulator offers new and useful benefits when used with a batt/blanket or other friction fit cavity insulation products. A major benefit is greater contact between the cavity insulator and the framing insulator and minimization of air gaps. Linked air gaps directly contribute to convective heat loses in a building envelope through a phenomenon known as convective looping. Shaped insulators also allow low cost installation techniques which improve the overall building thermal performance without changing the materials and the methods currently used to fill the cavities with insulation.

One area of concern in conventional construction where there exists substantial thermal bridging is the area where a top plate/track of a top floor meets with ceiling joists/bottom chords of roof trusses that extend beyond the plane of an exterior wall to the eaves. The bottom chords of the roof trusses run out across the top track in the exterior wall assemblies. The soffits are frequently left open to outside air for attic ventilation and attic moisture removal. The ceiling joists act like heat fins, bringing the outdoor temperature deep into the "insulated" ceiling above the top-level floor. They also conduct heat from the outside air directly to the top track and wall studs. It is difficult to insulate the framing in this application without encapsulating/enclosing all of the members in both a conductive and convective air-barrier or jacket. At this junction a major thermal connection pathway occurs in a direction parallel to the wall studs. This problem can be addressed effectively by using a structural insulator according to this invention between the bottom chord of the roof truss/ceiling joist and the top track or plate. The framing sections that are essentially exposed to outdoor air in ventilated designs can also be wrapped in air sealing and conductive insulation materials. The top track can also be insulated on one or both of the flanges. These measures substantially reduce the three dimensional heat transfer losses in these details.

One approach to isolate these members from the indoor condition and from the exterior walls is to install a high structural performance insulation material between the top plate and the joists. This insulator has structural properties to transmit effectively the normal building loads between the joists and the walls. Because of the compressive loading, high compression resistance such as that found in wood and other high density engineered materials is required to transmit the static and dynamic loads imposed by the roof to the framing. While a sill sealer material that is typically used between the foundation and sill plate of the frame could be used here for air sealing, this approach would add minimal conductive resistance to heat transfer. Where fire concerns are not paramount, a high density plastic foam insulator can be used to serve the dual functions of air-sealing as a convective barrier and thermal resistance as a conductive barrier. The issue of compressive creep of the insulator can be addressed by either specifying that the insulator either be sufficiently resistant to the design loads, using an appropriate safety factor for the material, or that the insulator be sufficiently compressed during installation to minimize creep in the future.

According to another embodiment, a high compression strength material or composite can be combined with a thin layer highly compressible gasket such a foam tape or flexible foam without adhesive. The layer may be on the order of ¼ inch in thickness, or less. Utilizing a high-shear strength tape or structural adhesive on both sides of the high compressive strength insulator will further enhance the performance of the assembly. A high service temperature gasket material to match the service temperature of the high compressive resistance insulator is preferred. The convective barrier/gasket should compress under static loads, for example to about ⅛ of an inch, or less to minimize the risk of a wobbly roof in extreme temperature conditions, such as during a fire.

A high compressive strength insulator may be a lower performance thermal insulator than typical insulation materials due to the thermal conductivity of the structure, which may be related to material characteristics such as cell wall thickness, density, etc. Examples of acceptable materials include wood, laminated veneer lumber, cellulose composites, fiberglass composites, ceramic alloys, graphite, etc. According to one embodiment, the entire top track may be covered with a wood plate, using a foam gasket at all junction points. Another method entails placing composite insulated framing pads directly at these junction points.

A preferred insulator embodiment is both flame retardant and has a high degree of dimensional stability. Temperature resistance is desirable to maintain the fire performance rating of the assembly. The insulator may also have thermal properties which effectively minimize the thermal bridging effects at this junction. The joists can be insulated on the underside (interior) flange surface, thereby effectively isolating the ceiling joist/bottom chord of roof truss from the interior condition and from the walls.

Composite members according to this invention may also be employed to provide energy efficient floor and ceilings members and joists. An insulator placed in between the top of a floor joist and a subfloor allows a greater quantity of insulation to be disposed in the bay. Also, there are significant acoustic benefits, because a slightly compressible insulator eliminates the squeaking of steel-to-steel connections. Insulators may also be applied to the tops of ceiling joists in attic spaces to prevent thermal bridging when the joists are either not completely covered by insulation or to allow larger quantities of insulation to be applied beneath a flooring sheet good installed thereover.

Attaching foam insulators to structural sheathing can reduce job-site or manufacturing-site construction labor. This benefit is achieved by combining two individual steps of applying the insulation board and applying the sheathing into a single step. Similar time and labor saving economies can be achieved by pre-applying the insulators to either structural sheathing, drywall wallboard, other wall finish board/sheet form materials, or to the framing members themselves for both thermal and acoustic insulation purposes. When pre-applying insulator strips to board/sheet goods, the strips are spaced along one axis of the board to match the framing spacing and also along the edges.

Adhesive-backed or factory-applied flat insulators that are installed on structural sheathing can also face the exterior rather than facing the framing members. This will stop the thermal bridging but will not extend the cavity. To achieve the maximum thermal performance with this type of application, it is desirable to install an air-barrier such as a stucco plaster or house wrap on top of the insulation members.

There are many benefits associated with forming the insulator portions of the composite member on the structural support or adhesively bonding a rigid insulator to the framing in a factory environment. For example, alignment and insulator material separation distances can be closely controlled to ensure that the resulting composite member is flat and level with squared surfaces. Further, any chemical off-gassing resulting from curing of the foam or the adhesive can be accommodated. For example, with a urethane that requires a water spray for curing, the water combines with the adhesive to create carbon dioxide. Controlled manufacturing results in uniform bond strength and thickness as well as a uniformly level surface of the insulated framing or insulated sheathing assembly. Further, there is no construction site delay while waiting for the adhesive to cure.

If desired, optimal structural, thermal, and acoustic resistances can be achieved by adhesively bonding insulators to the structural support, for example sheathing in the case of insulated framing or framing in the case of insulated sheathing.

Rather than applying an insulator with an adhesive or a friction-fit, the insulator may be directly bonded to the structural support during manufacture by forming the insulator directly on the support. For example, a cold rolled light gauge steel member could be coated with a layer of between about $\frac{1}{32}$ to 4 inches in thickness of a water-formed structural density polyurethane rigid foam. Advantages of this manufacturing method include insulator material savings, cost-effective coupling of high density structural support material (steel) with low density insulator material (structural foam) for transportation and distribution, greater control of finished product strength, reduction of manufacturing steps, and savings in on-site job labor. The manufacturing setting also enables the controlled production of engineered and graded levels of composites for general use as well as for high wind and seismic class applications.

By forming the insulator directly on the framing members or other structural support, several benefits may be realized. For example, there are benefits in terms of transportation lifecycle material processing costs. The density of a liquid formulation of polyurethane and polyol foaming agent is much higher than the density of the rigid foam achieved after forming and curing. Regarding distribution, combining a low density insulator (1 to 15 $lb/ft^3$) with a high density structural support framing member such as wood (26 to 60 $lb/ft^3$) or steel (489 $lb/ft^3$) offers a highly efficient transportation proposition. The low density insulator takes up volume but weighs essentially nothing in comparison to the high weight framing load. A structural insulator/framing composite allows for more efficient loading of transportation vessels such as trucks, rail cars, ships, vans, etc. Further, the minimal compressive strength of the insulator should be at least about 10 psi compressive resistance to 10% compression, for example, 0.87 $lb/ft^3$ density in a polystyrene insulator. Higher compressive strengths such as 25, 40, 60, and 100 minimum psi resistance to 10% compression provide increasingly greater structural benefits in terms of handling, transporting, installing, and assembled strength, for example densities ranging from 1.7 to 4 $lb/ft^3$ in extruded polystyrene. Much higher compressive strengths are available with products such as 7 to 13 $lb/ft^3$ polyurethane or wood products; however, at higher strengths, thermal conductivity tends to increase. Depending on the application, the insulator can be formed to cover one or both flanges of the framing member. The width and thickness of the insulator will also depend on the particular application.

The thermal barrier works equally well when the insulator is placed on the interior surface of the framing as it does on the external flange surface. High levels of thermal performance can also be attained by placing the insulator on both the interior and exterior sides of the framing member, or alternatively in the middle of two rigid structural members.

The insulator can act as a structural link between the structural sheathing and the framing members. The lateral resistance of the building assembly, which is frequently measured by shear wall tests, can be enhanced by the use of a structural adhesive or by decreasing the edge mechanical fastening (screw, nail, etc.) spacing. To achieve enhanced structural benefits, either mechanical fasteners or a structural adhesive can be used. For mechanical fastener applications, increasing the fastener diameter directly contributes to increased racking resistance of the assembly. Fastener head diameter also directly contributes to the stiffness of the assembly. Lower compressive strength insulators and greater thicknesses contribute to increased ductility of the assembly. For example, with a given fastener schedule, size, and insulator type, a 2 inch thickness exhibits greater ductility than a ½ inch thickness. Higher compressive strength insulators also tend to exhibit more resistance to compressive creep, providing greater dimensional stability over time. The recommended safety factor for the selected material should be used to determine if the assembly will provide sufficient resistance to the normal building loads for the specific application.

Equivalent shear strengths can be achieved at identical fastening schedules, for example $\frac{3}{12}$ (i.e. 3 inches along the edges and 12 inches in the field of the board), by using fasteners with a thicker wire diameter. Using a number 14 screw at a $\frac{3}{12}$ spacing with plywood sheathing on an insulated wall provides 1772 lb/ft nominal ultimate density. In comparison, using a code minimum number 8 screw at a $\frac{3}{12}$ spacing with plywood sheathing on an uninsulated wall provides approximately the same value. Enlarging the head of the screw or using a washer tends to increase the stiffness of the assembly. The head size should not be too large, because if the wall is too stiff, the fastener will crack below the head. This is not a desired mode of failure for the assembly. An optimal head size is between about 0.375 inches and 1 inch in diameter or larger. Further, a fastener should have a minor diameter that is greater than a diameter of the point, whether the point is sharp, self-drill, or other type. This ensures good contact between the boundary of the hole and the fastener shank. If a threaded fastener is used, a buttress thread or modified buttress thread can be used to increase torque and pull-out values. Optionally a longer unthreaded shank mid-section may be used to accommodate the insulator thickness and contribute greater stiffness to the assembly.

For adhesive applications, increasing the shear strength of the insulator increases the maximum resistance to lateral wind and earthquake loads. If the adhesive bond has shear or peel-off resistance that is greater than or equal to that of the insulator, then mechanical fasteners need only be used to hold the insulator in place until the adhesive bond strength fully develops. The overall assembly should also meet minimum fire safety requirements. For example, extruded polystyrene material should be separated from the building interior by a 15 minute thermal barrier such as ½ inch thick gypsum wallboard.

Maximum thermal and shear benefits may be achieved when a structural adhesive is either applied to both the framing/insulator and sheathing/insulator interfaces or when the insulator is formed on or bonded to the framing member during manufacture, prior to bonding with the sheet material. The purpose of the structural adhesive is to eliminate relative motion between the structural elements. This is also the function of mechanical fasteners such as screws, nails, etc. One benefit of adhesives is the efficient transfer of normal static and dynamic building loads such as racking, compression, tension, etc. without the thermal transfer inherent with penetrating, highly conductive metallic fasteners and without the acoustic energy transfer inherent with penetrating vibrating metallic fasteners. With or without the mechanical fasteners, the insulator acts as both a thermal break and an acoustic damping assembly.

With a rigid insulator that is adhesively pre-bonded to either the framing or the structural sheathing or other board/sheet-type sheathing or cladding, it is desirable to use a structural adhesive that develops a bond strength exhibiting structural resistance properties that are greater than or equal to those of the rigid insulator. If the fully developed bond does not meet or exceed the strength of the insulator, there is a high probability that shear or other load failure will first occur at the bond, resulting in full or partial disassociation of the insulation from the framing or sheathing/ cladding material. This limits the transportability and practicality of the insulated framing or sheathing board. It also compromises the installed structural performance of the entire building assembly.

Matching the structural resistance of the insulator and the bond strength ensures that the insulator can provide the designed structural performance for shear wall and wind loading conditions. By doing this, the probability of bond failure due to damage or loading will be the same at any point or location in the insulator. A bond strength that exceeds the structural resistance of the insulator increases the likelihood that ultimate loading failure will occur at some point within the insulator, further ensuring that the insulator will be able to meet its designed contribution to the shear-wall strength of the structure. The adhesive bond strength measured by the tensile and shear resistances are important measures for how the bond will contribute to the overall building assembly's resistance to wind and seismic (lateral or racking) loads. In adhesively applied insulated framing composite members, an important measure of structural resistance to racking loads is the shear strength of the insulator. By designing in this manner, it is possible to design adhesively bonded insulating framing members based on the shear strength of the insulator and the area and thickness of this layer. For these reasons, it is the shear strength of the insulator and the tensile strength of the adhesive that are to be matched.

For example, consider using a one inch thick extruded polystyrene ("XPS") insulation material that exhibits an average of 35 psi shear resistance. To allow the overall building assembly to benefit from the XPS material's structural contributions (load-transfer linking between the sheathing and the framing), it is necessary to use an adhesive that exhibits a fully developed bond strength with the framing and the insulator as well as internal tensile strength of at least 35 psi. If an adhesive is used and a lower strength bond develops, the above described benefits will be diminished. To what degree the performance is diminished will vary based on the particular application. For example, using the same XPS material with an adhesive where the adhesive develops a 20 psi tensile resistance will still be suitable for many structural, thermal, and acoustic applications.

As mentioned hereinabove, the insulators may be used for acoustic isolation as well as thermal isolation. A soft vibration damping elastic insulator material may be applied to the structural framing. The insulator material should be able to maintain the normal compressive building loads for the given type of construction. An example of a material that satisfies these conditions is elasticized expanded polystyrene. Expanded polystyrene material which has been compressed to about ⅓ of its original thickness breaks the cellular structure within the polystyrene beads. This elasticity along the framing mitigates the direct transfer of acoustic energy between the wallboard/sheathing/sub-floor paneling and the structural members such as joists, beams, studs, tracks, headers, corners, multiple members at jambs, etc.

The semi-rigid elastic insulation material can provide acoustic insulation in both interior and exterior walls, partitions, ceilings, and roofs. A basic principle of sound insulation is to prevent the transmission of sound vibration from one environment, partition, device, etc. to another. When dealing with a partition such as a wall, floor, or ceiling, there are basically three approaches: increase the mass of the partition thus making the partition more difficult to vibrate; disconnect the partition from the source of sound vibration; or a combination of both mass-increase and partition-disconnection. Disconnection of the partition is done by using resilient/elastic materials or devices between the partition and the structure, like metal studs, for example, that work as vibration absorbers in combination with springs, neoprene pads, compressed fiberglass, etc. The friction-fit thermal and acoustic insulator pieces offer unparalleled ease of installation and function. Such an application obviates the need for resilient Z-furring strips.

For both thermal and acoustic applications, the insulating properties can be achieved by eliminating the thermal and acoustic bridging through the mechanical fasteners. Options for this include using an insulating gasket to surround the fasteners, making the fasteners out of an insulating material, or by reducing the quantity of fasteners employed. The third option can be achieved by using a structural adhesive with the strength properties described above. The friction-fit arms reduce/dampen the vibration of the framing members, specifically metal framing, which thereby further reduce sound transmission through framed enclosures.

The density and microstructure (cellular vs. composite) of the insulating material affects both the acoustic and thermal insulating capacities. With acoustic insulators, air should be able to flow through the material and the more elastic the better. For thermal insulators, this air permeability is not desired.

Using the C- or U-shaped insulator friction-fit design where the insulator is flush with the flange surface and the arms extend along the sides results in improved thermal resistance of the framing. The arms improve the resistance to lateral heat flow. Extending behind the flange surface of a metal stud, purlin, or any other engineered framing shapes does not provide any substantial beneficial increase in the thermal resistance of the assembly. This is because heat flows preferentially along the path of least resistance. In the case of thermal energy traveling along a metal stud, for example, placing higher-quality rigid insulating material behind the flange surface does not provide an appreciable benefit over lower-quality cavity insulating material. It would be necessary to provide insulating material in complete contact with the framing member. If the metal stud insulator extends behind the stud flange, air gaps are left open. These air spaces act as channels for increased heat loss through natural and forced convection. Furthermore, these air spaces will become condensing surfaces when the framing temperature is below the dew point of the air/vapor mixture in the cavity. This condensation can lead to the deterioration of the framing member, for example, corrosion in metals.

The U- or C-shaped friction-fit design installs on flanges of framing members to provide easy installation without the need for interim fasteners. Further, the friction-fit thermal insulator uses a minimal quantity of insulator material to achieve the easy friction-fit installation. The arms also provide increased resistance to lateral heat transfer. This enables the extra cavity depth to be effectively used as an insulating air space or filled completely with loose-fill, batt-type, or blown-in insulation. The resistance to lateral heat transfer can also be increased by making the width of the insulating members greater. This is particularly beneficial when wall depth is limited by other constraints such as the window jamb depth. In this case, higher thermal performance can be achieved by making the insulators wider.

The insulator also acts as a gasket or air barrier in the building assembly. This contributes to the overall air tightness and thermal performance of the assembly and takes the place of using other sealants for this purpose. When the extra cavity depth is used as an insulating air space, the rigid insulating material ensures that the air in the cavity remains still which helps to prevent heat convection.

The interim attachment means for flat, non friction-fit insulators can be a magnetic tape or coating when the insulator is applied to ferrous steel framing. One benefit of using magnetic coating/strips as interim attachment means for insulated framing is that the insulators can be applied and repositioned as necessary.

To accommodate insulated framing structural supports with inwardly projecting lips, such as insulated C-shaped metal studs, fibrous (semi-flexible) cavity insulation can be scored to better accommodate the structural support. For example, one side of the semi-flexible cavity insulation is perforated to approximately half of its thickness to accept the interior bend of the C-section while closely following the contour of the insulator. This perforation minimizes the risk of performance deteriorating air gaps between the cavity insulation and the insulated framing.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A composite member adapted to be positioned in and form a part of a structural element of a building, the composite member comprising:
    an elongate structural support having an external surface and a cross-sectional perimeter; and
    an insulator comprising a pair of friction arms forming a U-shaped channel therebetween in which the structural support is disposed such that the insulator is in contact with solely a portion of the external surface generally along no greater than about one half of the perimeter to provide a thermal break between the structural support and structure supported thereby along a load path passing through the insulator, wherein the insulator has a lower thermal conductivity than the structural support and a width of the insulator channel is smaller than a nominal mating width of the structural support, such that the insulator is elastically deformed when the support is disposed in the channel.

2. The invention according to claim 1 further comprising a second insulator in contact with solely a second portion of the external surface generally along no greater than about one half of the perimeter to provide a thermal break between the structural support and additional structure supported thereby along a load path passing through the second insulator, wherein the second insulator has a lower thermal conductivity than the structural support.

3. The invention according to claim 1 wherein the insulator is further maintained in contact with the external surface by adhesion.

4. The invention according to claim 1 wherein the insulator is further maintained in contact with the external surface by magnetic attraction.

5. The invention according to claim 1 wherein the insulator is formed on the structural support.

6. The invention according to claim 1 wherein the structural support comprises a framing member.

7. The invention according to claim 1 further comprising the structure supported thereby, wherein the structural element is selected from the group consisting of walls, floors, ceilings, and roofs.

8. The invention according to claim 1 wherein the insulator further comprises a wing.

9. The invention according to claim 1 wherein the insulator forms at least one longitudinally disposed slot therein.

10. A method for constructing a structural element of a building comprising the steps of:
    providing a plurality of structural supports and insulators;
    assembling the structural supports into a generally planar structural frame so that the insulators lie generally within a plane; and
    covering the insulators with a structural sheet good by mechanically fastening the sheet good to the structural supports through the insulators so as to provide a thermal break between the sheet good and the structural frame along load paths passing through the insulators, wherein the insulators have a lower thermal conductivity than the structural supports and a minimum compressive strength of about 10 psi compressive resistance to 10% compression, wherein the insulator in combination with the sheet good provides structural integrity to the structural element and resistance to building loads.

11. The invention according to claim 10 wherein the mechanically fastening step includes using pointed, modified buttress thread screws each having an enlarged diameter head and a point diameter smaller than a minor diameter of a shank of the screw.

12. The invention according to claim 10 wherein the structural element is selected from the group consisting of walls, floors, ceilings, and roofs.

13. The invention according to claim 10 wherein the structural element comprises a shear wall.

14. An insulator adapted for use in a cavity bounded at least in part by an elongate structural element having a perimeter wall with an inwardly projecting lip, the wall forming a generally longitudinally disposed channel therein, the insulator comprising:
    an at least semi-flexible fibrous batt forming a slot located along at least one edge thereof adapted to receive therein the lip, wherein the fibrous batt is sized and the slot is located such that the fibrous batt is adapted to substantially fill both the cavity and the channel when installed, thereby reducing air gaps in the cavity and the channel and associated convective looping.

15. The invention according to claim 14 wherein the fibrous batt forms a second slot adapted to receive therein a second lip of the elongate structural element.

16. the invention according to claim 15 wherein the slots are generally aligned and located along opposite edges of the fibrous batt.

17. A composite member adapted to be positioned in and form a part of a structural element of a building, the composite member comprising:
    an elongate structural support having a depth dimension and a width dimension measured generally perpendicular thereto, wherein the width dimension is less than the depth dimension and further wherein the width dimension is measured along an edge disposed generally perpendicular to a predominant direction of unidimensional heat conduction when installed in the building; and an insulator in contact with the edge to provide a thermal break between the structural support and structure supported thereby along a load path passing through the insulator, wherein the insulator has a lower thermal conductivity than the structural support, the insulator is bonded to the edge of the structural support, and bond strength exhibits structural resistance properties that are greater than or equal to a structural resistance property of the insulator.

18. The invention according to claim 17, wherein the structural resistance properties are selected from the group consisting of shear strength and tensile strength.

19. A composite member adapted to be positioned in and form a part of a structural element of a building, the composite member comprising:
- an elongate structural support having an external surface comprising:
  - an edge disposed generally perpendicular to a predominant direction of unidimensional heat conduction when installed in the building; and
  - first and second flanges extending from the edge forming a C-shaped channel therebetween; and
- an insulator in contact with the edge to provide a thermal break between the structural support and structure supported thereby along a load path passing through the insulator, wherein:
  - the structural element is selected from the group consisting of floors and ceilings;
  - the elongate structural support is a metal joist track, the C-shaped channel thereof for receiving a joist end therein; and
  - the insulator has a lower thermal conductivity than the structural support and a minimum compressive strength of about 10 psi compressive resistance to 10% compression.

20. The invention according to claim 19, wherein the insulator is maintained in contact with the external surface by adhesion.

21. A composite member adapted to be positioned in and form a part of a structural element of a building, the composite member comprising:
- an elongate structural support having an external surface comprising:
  - an edge disposed generally perpendicular to a predominant direction of unidimensional heat conduction when installed in the building; and
  - first and second flanges extending from the edge forming a C-shaped channel therebetween; and
- an insulator in contact with the edge to provide a thermal break between the structural support and structure supported thereby along a load path passing through the insulator, wherein:
- the insulator is bonded to the edge of the structural support, and bond strength exhibits structural resistance properties that are greater than or equal to a structural resistance property of the insulator;
- the structural element is selected from the group consisting of floors and ceilings;
- the elongate structural support is a metal joist track, the C-shaped channel thereof for receiving a joist end therein; and
- the insulator has a lower thermal conductivity than the structural support.

* * * * *